(12) United States Patent
Ishida et al.

(10) Patent No.: US 11,295,407 B2
(45) Date of Patent: Apr. 5, 2022

(54) INFORMATION PROCESSING APPARATUS, INFORMATION PROCESSING METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventors: Yuki Ishida, Kawasaki (JP); Mitsuru Uratani, Kawasaki (JP); Hiroyuki Sakai, Chigasaki (JP); Yuki Omagari, Tokyo (JP); Tomohiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 16/017,034

(22) Filed: Jun. 25, 2018

(65) Prior Publication Data

US 2019/0005601 A1    Jan. 3, 2019

(30) Foreign Application Priority Data

Jun. 28, 2017 (JP) .............................. JP2017-126521

(51) Int. Cl.
| | |
|---|---|
| *G06T 1/00* | (2006.01) |
| *H04N 1/54* | (2006.01) |
| *H04N 1/40* | (2006.01) |
| *H04N 1/32* | (2006.01) |

(52) U.S. Cl.
CPC ............ *G06T 1/0028* (2013.01); *G06T 1/005* (2013.01); *H04N 1/32149* (2013.01); *H04N 1/54* (2013.01); *G06T 2201/0052* (2013.01); *G06T 2201/0053* (2013.01); *G06T 2201/0065* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 7,142,689 B2 | 11/2006 | Hayashi et al. | |
| 2007/0108287 A1* | 5/2007 | Davis | G07D 7/20 235/462.01 |
| 2008/0012872 A1* | 1/2008 | Flickinger | H04N 21/4385 345/581 |
| 2012/0163653 A1* | 6/2012 | Anan | H04N 19/467 382/100 |

(Continued)

FOREIGN PATENT DOCUMENTS

| | | |
|---|---|---|
| JP | 2002281283 A | 9/2002 |
| JP | 3959890 B | 8/2007 |

(Continued)

OTHER PUBLICATIONS

Japanese Office Action issued in corresponding Japanese Application No. 2017126521 dated Feb. 14, 2020.

*Primary Examiner* — Emily C Terrell
*Assistant Examiner* — Nathan J Bloom
(74) *Attorney, Agent, or Firm* — Venable LLP

(57) ABSTRACT

The first image data is converted into the second image data defined by a color space that depends on an output apparatus that outputs image data. Additional information is multiplexed on the converted second image data by using a multiplex parameter.

2 Claims, 19 Drawing Sheets

(56) References Cited

U.S. PATENT DOCUMENTS

| | | | |
|---|---|---|---|
| 2013/0278796 A1* | 10/2013 | Ordoubadian | H04N 1/2112 348/231.6 |
| 2016/0080602 A1* | 3/2016 | Ishida | H04N 1/32203 358/3.28 |
| 2016/0300550 A1* | 10/2016 | Barker | G06T 1/0021 |
| 2017/0099408 A1* | 4/2017 | Miyake | H04N 1/3224 |

FOREIGN PATENT DOCUMENTS

| | | | |
|---|---|---|---|
| JP | 2013118597 A | * | 6/2013 |
| JP | 2013118597 A | | 6/2013 |

* cited by examiner

FIG 6

| NUMBER | BEFORE CONVERSION | | | AFTER CONVERSION | | |
|---|---|---|---|---|---|---|
| | R | G | B | R' | G' | ' |
| 1 | 0 | 0 | 0 | 0 | 0 | 5 |
| 2 | 0 | 0 | 16 | 0 | 5 | 32 |
| : | : | : | : | : | : | : |
| 16 | 0 | 0 | 240 | 0 | 65 | 229 |
| 17 | 0 | 0 | 255 | 0 | 66 | 238 |
| 18 | 0 | 16 | 0 | 3 | 40 | 0 |
| : | : | : | : | : | : | : |
| 289 | 0 | 255 | 255 | 4 | 240 | 239 |
| 290 | 16 | 0 | 0 | 30 | 0 | 1 |
| : | : | : | : | : | : | : |
| 4913 | 255 | 255 | 255 | 255 | 255 | 255 |

FIG 7

| NUMBER | INPUT | | | U APPLICATION VALUE | | |
|---|---|---|---|---|---|---|
| | Y | U | V | 0 | 2 | 1 |
| 1 | 0 | 128 | 128 | 118 | 108 | 128 |
| 2 | 0 | 128 | 112 | 118 | 108 | 128 |
| : | : | : | : | : | : | : |
| 16 | 0 | 128 | 112 | 118 | 108 | 128 |
| 17 | 0 | 128 | 127 | 118 | 108 | 128 |
| 18 | 0 | 112 | 0 | 112 | 102 | 122 |
| : | : | : | : | : | : | : |
| 289 | 0 | 127 | 127 | 117 | 127 | 107 |
| 290 | 16 | 128 | 128 | 118 | 108 | 128 |
| : | : | : | : | : | : | : |
| 4913 | 255 | 127 | 127 | 117 | 127 | 107 |

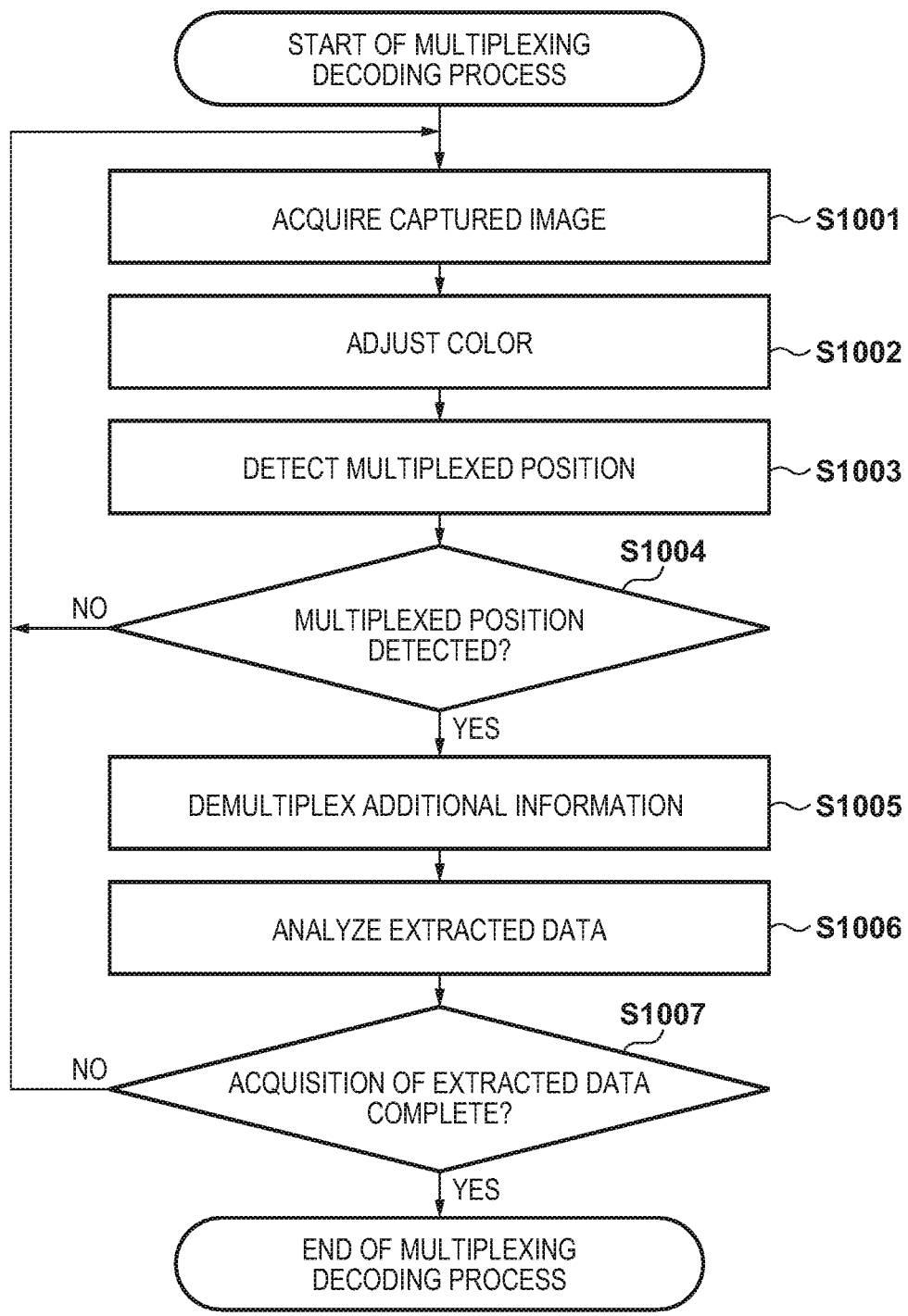

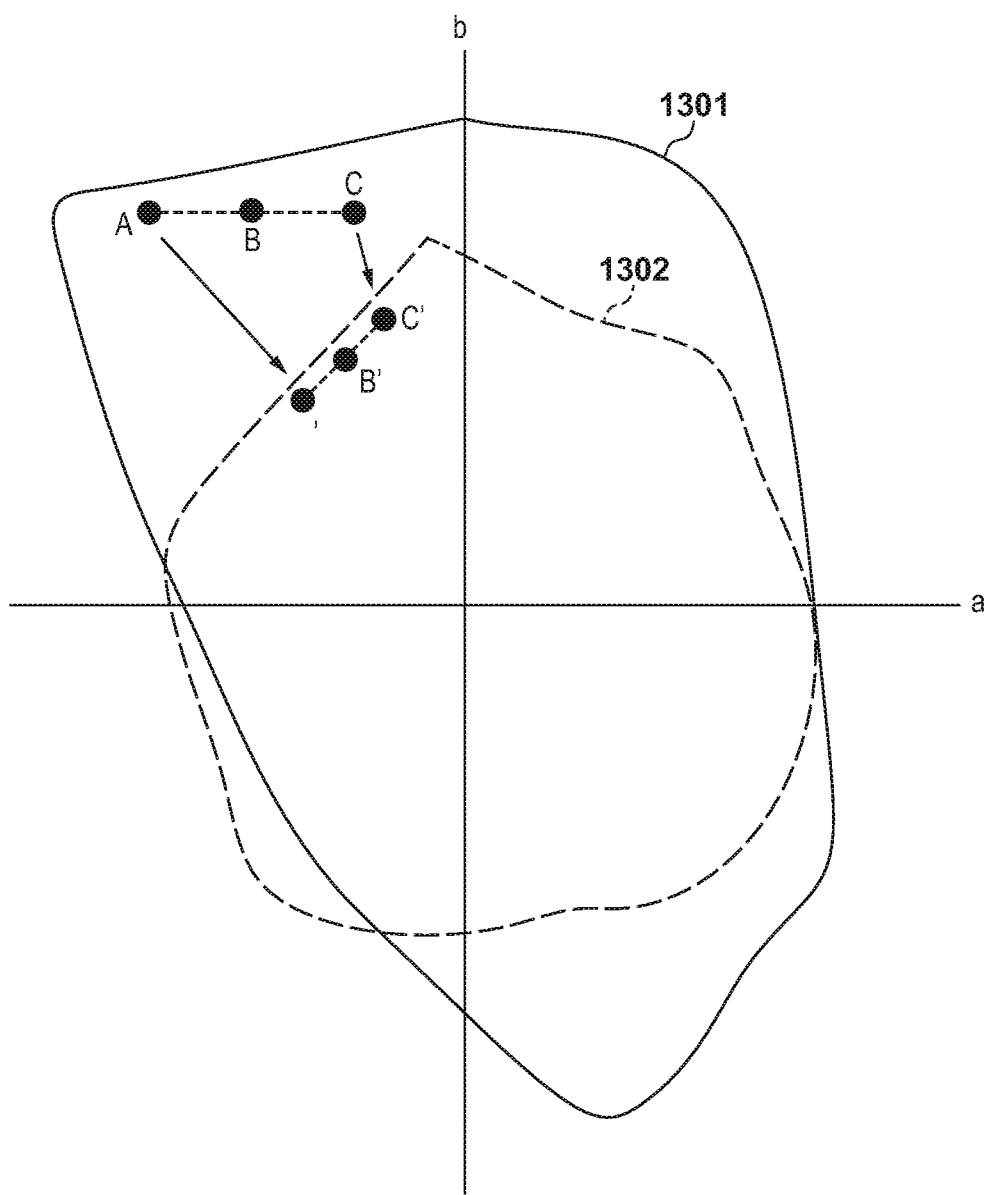

FIG. 14A

| 0  | 0  | 0  | -1 | -1 |
|----|----|----|----|----|
| 0  | -1 | -1 | -2 | -2 |
| -1 | 2  | 2  | -1 | -1 |
| 2  | -1 | -1 | 0  | 0  |
| -1 | 0  | 0  | 0  | 0  |

FIG. 14B

| 0  | 0  | -1 | 2  | -1 |
|----|----|----|----|----|
| 0  | 0  | -1 | 2  | -1 |
| 0  | -1 | 2  | -1 | 0  |
| 0  | -1 | 2  | -1 | 0  |
| -1 | 2  | -1 | 0  | 0  |

FIG. 20

| NUMBER | INPUT | | | RGB APPLICATION VALUE (0) | | | RGB APPLICATION VALUE (2) | | | RGB APPLICATION VALUE (-1) | | |
|---|---|---|---|---|---|---|---|---|---|---|---|---|
| | R | G | B | R | G | B | R | G | B | R | G | B |
| 1 | 0 | 0 | 0 | 3 | 2 | 5 | 11 | 6 | 65 | 24 | 22 | 1 |
| 2 | 0 | 0 | 16 | 11 | 10 | 32 | 25 | 5 | 109 | 18 | 22 | 4 |
| .. | .. | .. | .. | .. | .. | .. | .. | .. | .. | .. | .. | .. |
| 16 | 0 | 0 | 240 | 2 | 4 | 220 | 18 | 22 | 255 | 3 | 40 | 45 |
| 17 | 0 | 0 | 255 | 3 | 9 | 242 | 17 | 25 | 255 | 2 | 32 | 48 |
| 18 | 0 | 16 | 0 | 2 | 25 | 11 | 26 | 24 | 62 | 13 | 33 | 5 |
| .. | .. | .. | .. | .. | .. | .. | .. | .. | .. | .. | .. | .. |
| 289 | 0 | 255 | 255 | 2 | 245 | 246 | 22 | 190 | 255 | 3 | 240 | 128 |
| 290 | 16 | 0 | 0 | 37 | 3 | 8 | 27 | 5 | 70 | 41 | 32 | 2 |
| .. | .. | .. | .. | .. | .. | .. | .. | .. | .. | .. | .. | .. |
| 4913 | 255 | 255 | 255 | 240 | 242 | 245 | 239 | 240 | 255 | 247 | 248 | 190 |

INFORMATION PROCESSING APPARATUS, INFORMATION PROCESSING METHOD, AND NON-TRANSITORY COMPUTER-READABLE STORAGE MEDIUM STORING PROGRAM

BACKGROUND OF THE INVENTION

Field of the Invention

The present invention relates to an information processing apparatus that multiplexes additional information, an information processing method, and a non-transitory computer-readable storage medium storing a program.

Description of the Related Art

There is known a digital watermark technique of embedding (to be referred to as multiplexing hereinafter), in an image, additional information other than an image. In the digital watermark technique, for example, additional information such as an author name and permission/inhibition of the use is multiplexed on an image of a photograph, a painting, or the like such that the additional information is difficult to visually discriminate. As another application field, there is known a technique of multiplexing additional information on an image in order to specify an output device and its device number from an image output on paper, in order to prevent forgery of a paper money, stamp, securities, and the like along with the improvement of the image qualities of image output apparatuses such as a copying machine and printer. In order to extract the additional information that has been multiplexed on the image output on the paper, there is also known a technique of extracting the multiplexed additional information by shooting a target output product by an image capturing device such as a scanner or an integrated camera of a portable terminal and analyzing the shot image.

As a method of multiplexing additional information on an image, there is known a technique of embedding a pattern by modulating a color in a local region of the image. In Japanese Patent No. 3959890, an image is divided into blocks of 16 pixels (4×4 pixels), the half of the 16 pixels is set to original pixels+1, and the remaining half is set to the original pixels −1. It is possible to extract multiplexed additional information by printing an image and analyzing a modulation of an increase/decrease in pixel for each block of an image shot by an image capturing device. Since the pixels are increased/decreased in the local region, the pixels are averaged and hardly discriminated by the human eye at the time of printing.

When an image is output by an output device such as a printer, color conversion is generally performed from an input color space (sRGB, AdobeRGB, or the like) depending on a device such as a camera, a scanner, or a monitor to an output color space (deviceRGB or the like) depending on a device such as a printer. The input color space and the output color space are different in color reproduction range, and thus nonlinear color conversion is performed.

A color modulation in the input color space may be lost if color conversion is performed after multiplexing processing for modulating the color in the input color space is performed when additional information is multiplexed on the image. In particular, if the output color space is narrow relative to the input color space, a color modulation may be lost in a decreasing region. It becomes impossible to extract the additional information appropriately if the color modulation is lost.

SUMMARY OF THE INVENTION

An aspect of the present invention is to eliminate the above-mentioned problems with the conventional technology. The present invention provides an information processing apparatus that prevents a failure in extraction of additional information multiplexed on an output image by color conversion, an information processing method, and a non-transitory computer-readable storage medium storing a program.

The present invention in one aspect provides an information processing apparatus comprising: a first acquisition unit configured to acquire first image data; a first conversion unit configured to convert the first image data acquired by the first acquisition unit into second image data defined by a color space that depends on an output unit configured to output image data; and a multiplexing unit configured to multiplex, by using a multiplex parameter, additional information on the second image data converted by the first conversion unit.

According to the present invention, it is possible to prevent a failure in extraction of additional information multiplexed on an output image by color conversion.

Further features of the present invention will become apparent from the following description of exemplary embodiments with reference to the attached drawings.

BRIEF DESCRIPTION OF THE DRAWINGS

FIG. 6 is a view showing a color conversion table;

FIG. 7 is a view showing a multiplex parameter table;

FIG. 10 is a flowchart showing the multiplexing decoding process;

FIG. 13 is a graph showing color conversion;

FIGS. 14A and 14B are views each showing a mask pattern;

FIG. 20 is a view showing a table of a multiplex parameter.

DESCRIPTION OF THE EMBODIMENTS

Figure 1A:
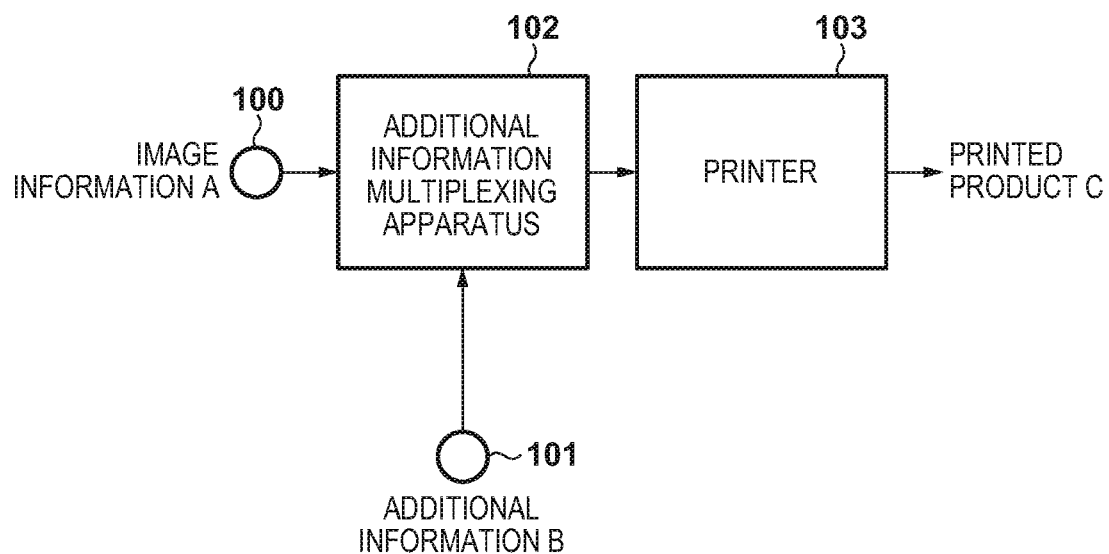
FIGS. 1A and 1B are block diagrams each showing the hardware arrangement of an image processing apparatus that performs a multiplexing encoding process.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will be omitted.

First Embodiment

Figure 1B:
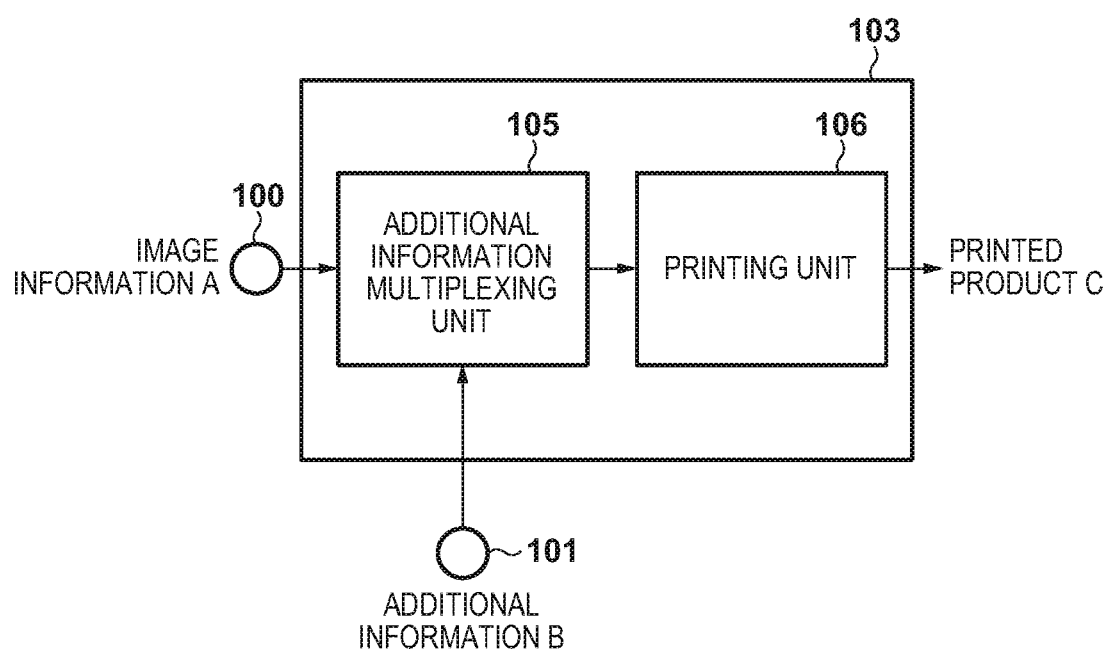

FIGS. 1A and 1B are block diagrams each showing the hardware arrangement of an image processing apparatus that performs multiplexing encoding of embedding additional information in image information according to this embodiment. In the image processing apparatus, image information A and additional information B are acquired, and a printed product C obtained by embedding the additional information B in the image information A is generated. FIG. 1A shows an arrangement in which an additional information multiplexing apparatus 102 different from a printer 103 performs a process of embedding the additional information B in the image information A. FIG. 1B shows an arrangement in which the process of embedding the additional information B in the image information A is performed in the printer 103.

In FIG. 1A, the image information A is input at an input terminal 100. The image information A is multi-tone image data that includes a chromaticity component. Further, the additional information B is input at an input terminal 101. The additional information B indicates text data, voice data, image data, and moving image data. Alternatively, the additional information B indicates text information, voice information, data obtained by compressing an image and moving image information, and data converted into another binary value. The additional information multiplexing apparatus 102 is an apparatus that performs a process of embedding the additional information B in the image information A. The details of the additional information multiplexing processing will be described later. The printer 103 prints image data obtained by embedding the additional information B in the image information A and generates the printed product C.

Figure 19:
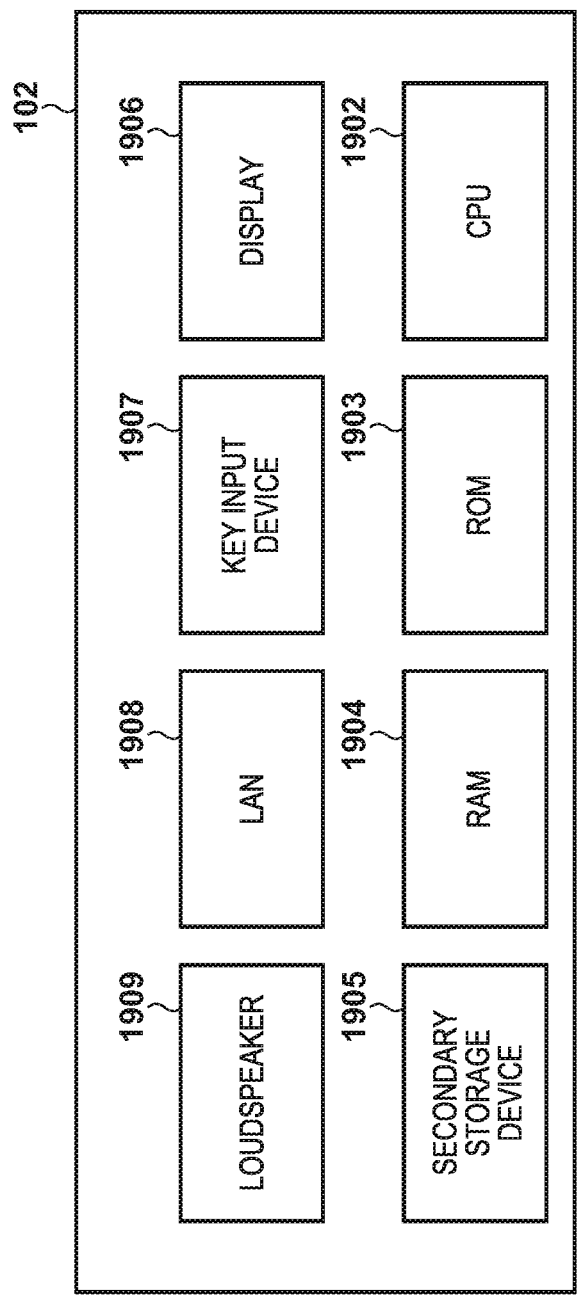
FIG. 19 is a block diagram showing the hardware arrangement of an additional information multiplexing apparatus.

FIG. 19 is a block diagram for explaining an example of the hardware arrangement of the additional information multiplexing apparatus 102 in FIG. 1A. A CPU 1902 is a central processing unit and performs, for example, a process of multiplexing additional information in accordance with a program. A ROM 1903 stores programs executed by the CPU 1902. A RAM 1904 provides a memory for temporarily storing various kinds of information when the CPU 1902 executes the programs. A secondary storage device 1905 is, for example, a hard disk, and is a storage medium for storing an image file, additional information, and the like.

A display 1906 displays a user interface screen, processing contents, or the like. A key input device 1907 accepts an instruction or setting of a process, a character input, or the like via an operation of a device such as a keyboard. A network interface 1908 is connected to, for example, a LAN (Local Area Network). Further, the LAN is connected to the Internet. The CPU 1902 accesses a site connected to the Internet by the network interface 1908 and displays a screen of the site on the display 1906 or transmits/receives data. The additional information multiplexing apparatus 102 is an information processing apparatus such as a PC or a smartphone, but may be an apparatus of any other form capable of performing the process of embedding the additional information B in the image information A.

FIG. 1B shows an arrangement in which the printer 103 includes an additional information multiplexing unit 105 corresponding to the additional information multiplexing apparatus 102. As in FIG. 1A, the image information A is input at the input terminal 100. Further, the additional information B is input at an input terminal 101. The additional information multiplexing unit 105 in the printer 103 performs the process of embedding the additional information B in the image information A. A printing unit 106 prints image data obtained by embedding the additional information B in the image information A with the additional information multiplexing unit 105 and generates the printed product C.

A method of printing the image data obtained by embedding the additional information B in the image information A and generating the printed product C shown in FIGS. 1A and 1B will be referred to as a multiplexing encoding process hereinafter.

Figure 2:
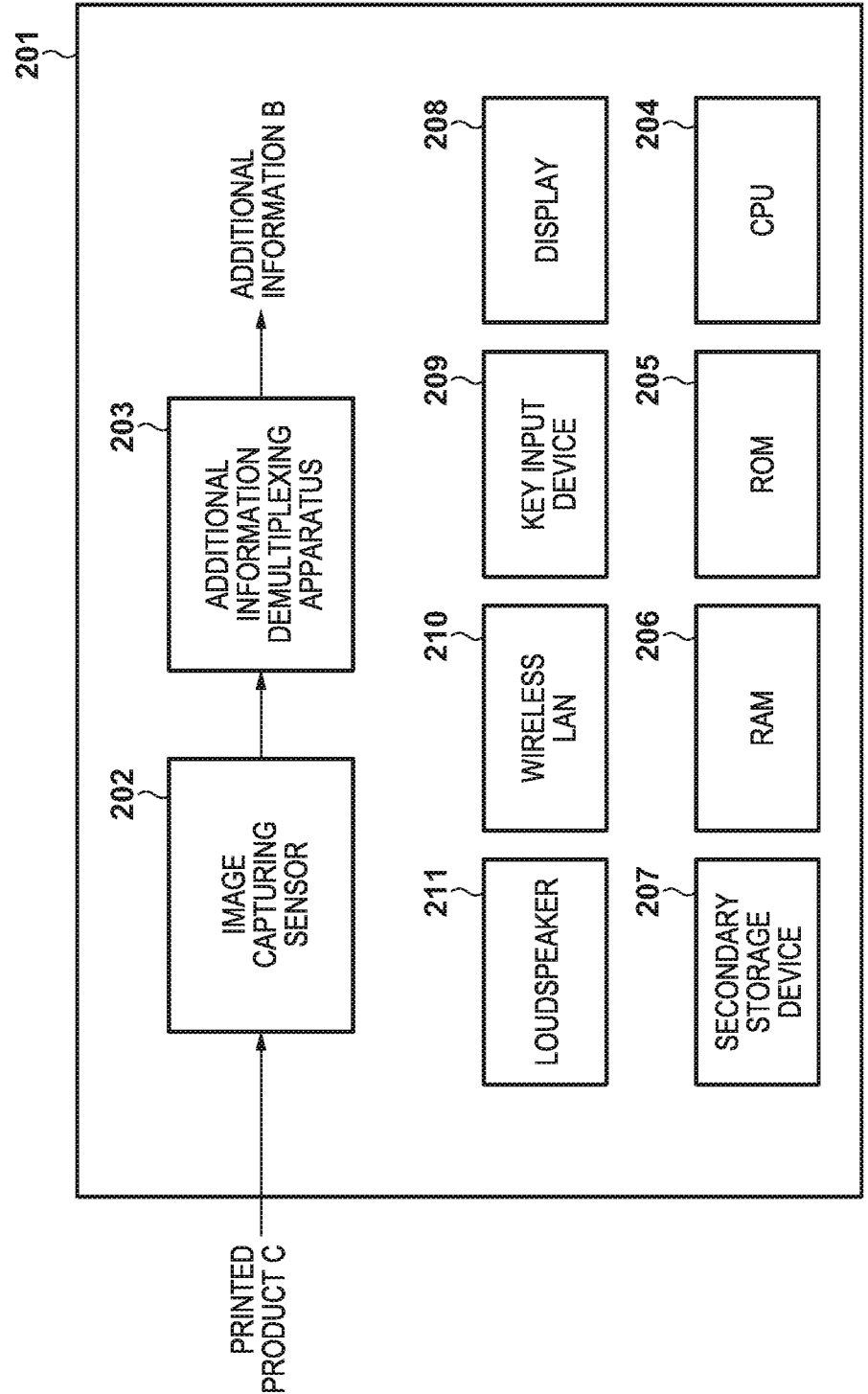
FIG. 2 is a block diagram showing the hardware arrangement of the image processing apparatus that performs a multiplexing decoding process.

FIG. 2 is a block diagram showing the hardware arrangement of the image processing apparatus that performs multiplexing decoding of extracting the additional information from the image information according to this embodiment. FIG. 2 shows an apparatus that extracts the embedded additional information B by capturing the printed product C that has undergone the multiplexing encoding process by an image capturing apparatus such as a camera and analyzing a shot image. In FIG. 2, a camera-equipped mobile terminal 201 includes an image capturing sensor 202 and has a function of shooting the printed product C. An additional information demultiplexing apparatus 203 extracts the additional information B by analyzing the image shot by the image capturing sensor 202. The details of additional information extraction processing will be described later.

A CPU 204 is a central processing unit and performs an information processing method described in this embodiment in accordance with a program. A ROM 205 stores programs executed by the CPU 204. A RAM 206 provides a memory for temporarily storing various kinds of information when the CPU 204 executes the programs. A secondary storage device 207 is, for example, a hard disk, and is a storage medium for storing an image file, a database that stores an image analysis result, and the like.

A display 208 displays extracted additional information as a processing result of this embodiment to a user. A key input device 209 is implemented by, for example, causing the display 208 to have a touch panel function, and accepts an instruction or setting of a process, a character input, or the like via an operation of a touch panel. A network interface 210 is connected to, for example, a wireless LAN (Local Area Network). Further, the LAN is connected to the Internet. The CPU 204 accesses a site connected to the Internet and displays a screen of the site on the display 208 or transmits/receives data.

A loudspeaker 211 outputs a voice when the extracted additional information is voice data or moving image data with a voice. If an access destination connected to the Internet includes moving image data, the loudspeaker 211 outputs a voice reproduced by the moving image data. The camera-equipped mobile terminal 201 integrates the image capturing sensor 202. However, the present invention is not limited to this arrangement. For example, another apparatus may control the image capturing sensor 202 to transmit a shot image to the additional information demultiplexing apparatus 203. The additional information B may be extracted from the printed product C by, for example, using a digital camera or a video camera as the image capturing sensor 202 and using a personal computer or a smartphone as the additional information demultiplexing apparatus 203.

A method of extracting the additional information B from the printed product C shown in FIG. 2 will be referred to as a multiplexing decoding process hereinafter.

<Description of Multiplexing Encoding Process>

Figure 3:
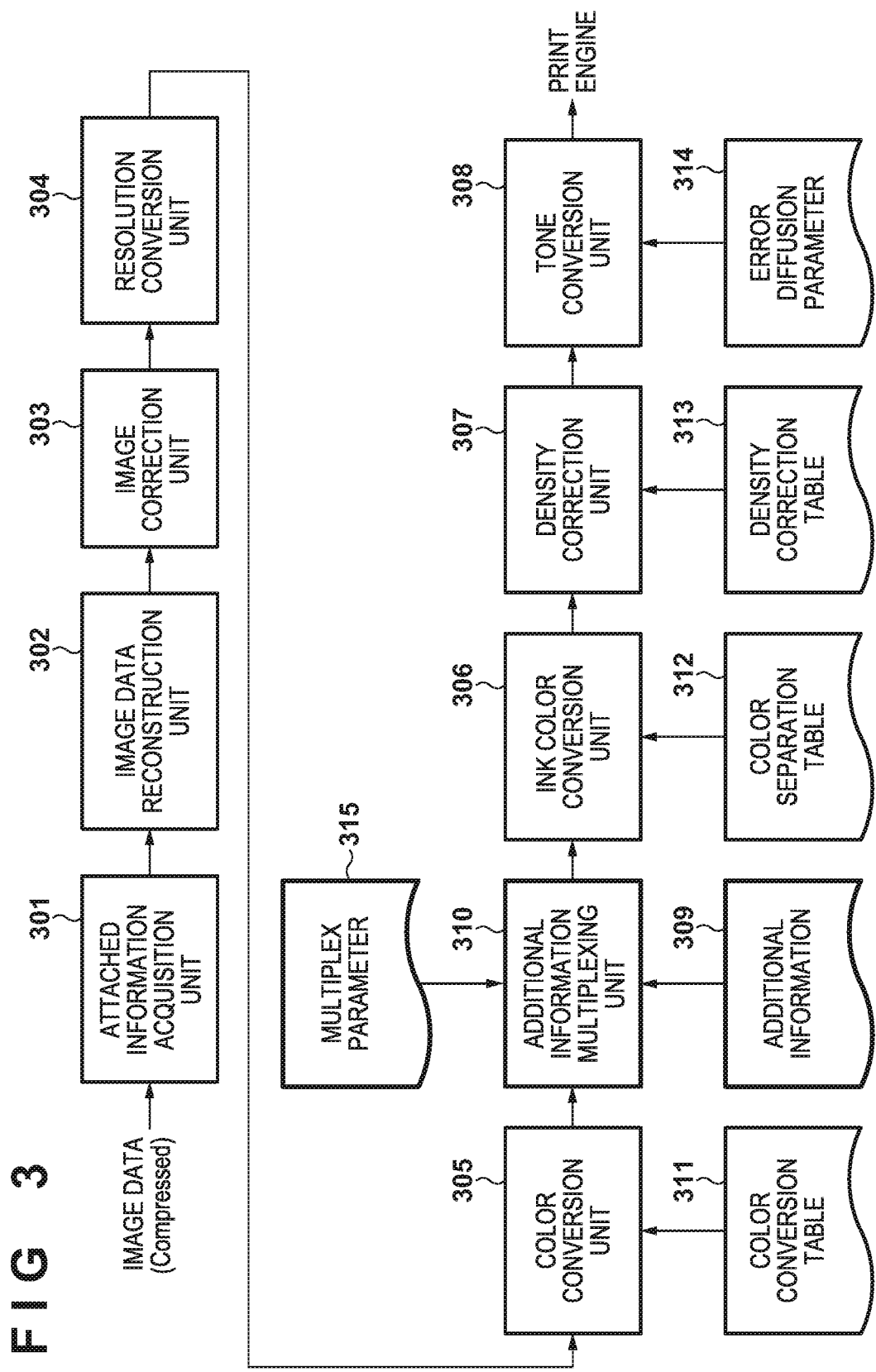
FIG. 3 is a block diagram showing the block arrangement of firmware in the multiplexing encoding process.

FIG. 3 is a block diagram showing the block arrangement of basic firmware in the multiplexing encoding process according to this embodiment. Image data undergoes a process to be described below, is converted into a resolution and the number of tones to be processed by a print engine connected to a printhead, and is transmitted. Each processing unit shown in FIG. 3 will be described.

An attached information acquisition unit 301 acquires various parameters used when image data is compressed. The various parameters used in the compression are sent to an image data reconstruction unit 302 and used for a process of extracting image data from a compressed image. Moreover, the various parameters used in the compression are sent to a compression degree calculation unit (not shown) and used for a process of calculating the compression degree.

For example, an input image is lossy image data obtained by compressing document data in a JPEG format and stored in a printing medium. The lossy image data includes a quantization table and image data size used in the compression. The attached information acquisition unit 301 sends acquired image data size information and quantization table to the image data reconstruction unit 302.

The image data reconstruction unit 302 decodes encoded image data to extract image data.

An image correction unit 303 performs image correction on RGB data acquired by the image data reconstruction unit 302. The image correction includes back-light correction, red-eye correction, and the like assuming photo print, in addition to lightness adjustment, contrast adjustment, and color balance adjustment to brighten or darken a whole color. These kinds of image correction can implement a process that does not depend on the printer 103 by performing a unified process in this block.

A resolution conversion unit 304 performs conversion processing into a resolution corresponding to the printer 103. A required magnification amount is derived from input image data and the resolution of the printer, performing enlargement or reduction processing. There are a nearest neighbor method, a bilinear method, a bicubic method, and the like as magnification processing to be selected appropriately based on processing characteristics or a processing speed.

A color conversion unit 305 performs conversion processing for obtaining a preferred color when output by the printer 103. For example, when an image displayed on a display device is printed by the printer, there is not always a match in a color reproduction range. A reproduction range is narrower in one color, or conversely, wider in another color in the printer than in the display device. It is therefore necessary to perform color compression/decompression appropriately while minimizing image degradation.

In this embodiment, the color conversion unit 305 performs conversion in an RGB format. That is, the color conversion unit 305 converts RGB values input to this block into RGB values for the printer (to be referred to as DeviceRGB hereinafter) taking device reproducibility into consideration. The conversion can also be performed by an arithmetic operation such as a matrix. In this embodiment, however, a three-dimensional color conversion table 311 is used.

If the input RGB values are expressed by 8 bits (256 tones) for each color, holding all combinations are not practical in terms of a capacity. Therefore, the color conversion table 311 uses values thinned at predetermined intervals. FIG. 6 shows an example of a color conversion table. FIG. 6 shows a table that sets 256 tones for each color as 17 grids and describes deviceRGB values corresponding to them (17×17×17=4913 grids). A value between the grids is calculated by interpolation processing. A known technique such as tetrahedron interpolation may be used for the interpolation processing.

As described above, the DeviceRGB values corresponding to target RGB values are calculated. Considering tonality, however, an output may be 8 bits or more. The color conversion table depends on the color reproduction range of the printer 103 as described above. Therefore, if, for example, printing paper sheets used for printing are different, tables corresponding to them are prepared. Note that in this embodiment, color conversion of a color space will be described by conversion from RGB to RGB. However, the present invention is also applicable to color conversion of a color space from CMYK to CMYK, from RGB to CMYK, from CMYK to RGB, or the like.

An ink color conversion unit 306 converts the DeviceRGB values converted by the color conversion unit 305 into values of ink colors. In this conversion, a color separation table 312 is used in which values of ink colors corresponding to the combination of the DeviceRGB values are described in advance. Note that similarly to the color conversion unit 305, a 17-grid table is also used in this block.

In this embodiment, four colors of cyan (C), magenta (M), yellow (Y), and black (K) are assumed as the ink colors, and a table is used in which the values of four colors corresponding to respective grids are described. These are values decided taking prevention of ink overflow on a paper surface of a printing paper sheet or ink spread when inks are adjacent to each other into consideration. That is, concerning the color separation table 312 as well, if printing paper sheets are different, tables corresponding to them are prepared. Similarly to the above-described color conversion table 311, values after ink decomposition corresponding to the target DeviceRGB values between the grids are obtained by applying tetrahedron interpolation or the like.

In the case of an inkjet printing method, overlapping dots are increased as an ink amount applied as dots on a printing paper sheet increases, making it difficult to increase a printing density. A density correction unit 307 performs correction so as to uniform density responsiveness. This makes it easier to ensure accuracy when the above-described color conversion table 311 and color separation table 312 are created.

It is only necessary that the density correction unit 307 performs correction for the respective colors of C, M, Y, and K, and thus a one-dimensional density correction table 313 is used here. For example, a table corresponding to input 8 bits (256 tones) for each color is prepared. Alternatively, a table in which a value corresponding to each signal value is described may be used without thinning.

A tone conversion unit 308 converts multi-bit data that has undergone ink color conversion and density correction into the number of tones printable by the printer 103. Tone conversion processing will be described here, and thus a description will be given assuming that the printer 103 has two tones (1 bit) of printing (1)/non-printing (0). An error diffusion method of excluding a low frequency component of an image and capable of visually appropriate tone reproduction is used as a tone conversion method. A description will be given assuming that an input signal can take 0 to 255 of 8 bits.

An error distribution method in the error diffusion method will be described here. Letting a signal value L be a signal value of a target pixel, comparison with a threshold TH is made. A threshold is set to 127 in order to binarize 0 to 255. According to the magnitude of the comparison result, it is determined as 1 (printing) if L>TH, and as 0 (non-printing) if L≤TH. Then, according to a determination result, a quantization representative value V is set to 255 for 1 (printing) and 0 for 0 (non-printing). At this time, an occurring error E (=L−V) is distributed to a surrounding pixel in accordance with a distribution coefficient. Then, a value La obtained by adding a distributed error Ea to the signal value L of a next target pixel is compared with a threshold. It is therefore determined as 1 (printing) if La>TH, and 0 (non-printing) if La≤TH. This processing is performed on all the pixels and all the ink colors of C, M, Y, and K, making it possible to acquire printable 1-bit ink color data. The tone conversion unit 308 sends the generated ink color data to the print engine.

The print engine includes a reception memory that stores received data, a CPU, and a printing unit that gives a printing material to the printing medium. In the print engine, the input ink color data is stored in the reception memory. The printing unit converts the ink color data into ink droplet data corresponding to a nozzle of the printhead. Print processing is performed by discharging ink droplets on the printing medium by a printhead that scans the ink droplet data in a direction crossing a media conveyance direction. In this embodiment, the arrangement of a serial scan type inkjet printing apparatus is shown. However, the present invention is also applicable to another printing apparatus such as a printing apparatus by a line head or a printing apparatus by a laser engine.

Additional information 309 indicates information embedded in the image information A input by the additional information multiplexing apparatus 102 shown in FIG. 1A or the additional information multiplexing unit 105 shown in FIG. 1B. For example, the additional information 309 is text data and is, for example, numerical data obtained by assigning a number or a character to a numerical value by using a character code. The numerical data is transmitted to an additional information multiplexing unit 310 as the additional information 309 of FIG. 3.

A description will be given by using, for example, information "hello" as text data. The text data is treated as numerical data, or so-called binary data. The binary data is information of "0" or "1" and has a specific meaning by connecting these pieces of information of "0" or "1" continuously. Although characters are treated normally on the PC, corresponding binary data is determined for each character. A code called a "character code" defines a correspondence between the binary data and the character. Taking "shift JIS" which is one of character codes as an example, "h" corresponds to "01101000" of the binary data. Likewise, "e" corresponds to "01100101", "l" corresponds to "01101100", and "o" corresponds to "01101111" of the binary data.

The characters of "hello" can be expressed as "0110100001100101011011000110110001101111" in the binary data. Conversely, if "0110100001100101 011011 000110110001101111" of the binary data can be acquired, the characters of "hello" can be acquired. The additional information 309 is numerical data converted into this binary data.

The additional information multiplexing unit 310 receives the additional information 309 and a multiplex parameter 315, and performs a process of multiplexing the additional information 309 on image data. In multiplexing processing, the additional information 309 obtained by converting a text document or the like into binary data of "0" and "1" is embedded in image data in a format capable of extracting and reading it at the subsequent stage. For example, in order to obtain a format capable of reading "0" and "1", mask processing is performed on the image data, causing an image region to have two periodicities.

Figure 11A:
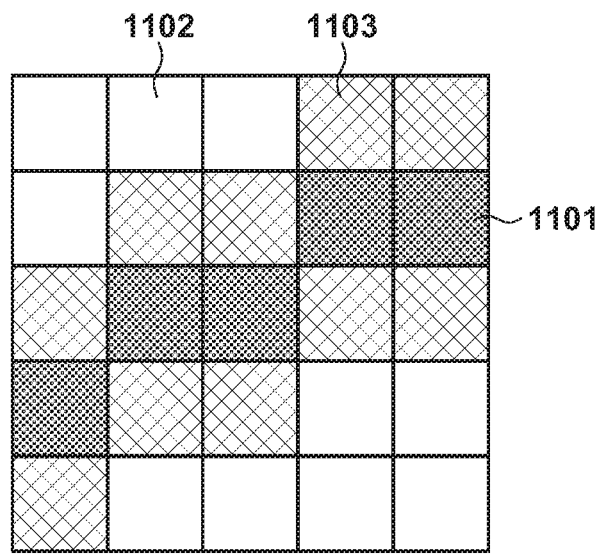
FIGS. 11A and 11B are conceptual views showing mask data.
Figure 11B:
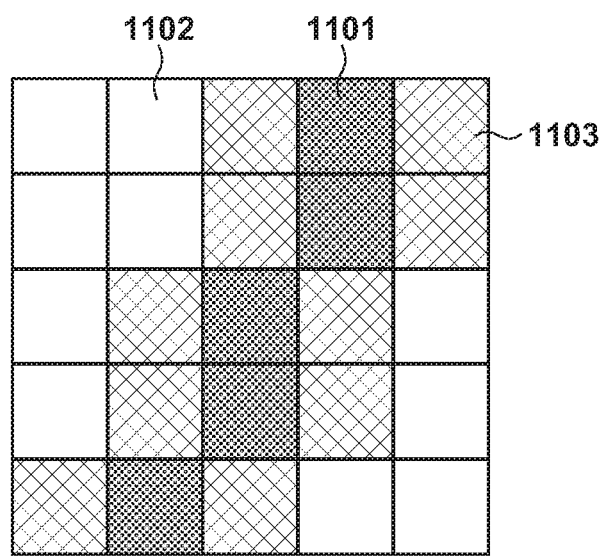

FIGS. 11A and 11B show an example of mask data in order to cause the image region to have the two periodicities. FIGS. 11A and 11B are conceptual views of the mask data. FIGS. 11A and 11B show the mask data each formed by 5 px (pixels)×5 px, and express "0" and "1" by mixing a pattern having two periodicities and an image with respect to regions each formed by 5 px×5 px. If the two periodicities can be determined by a frequency analysis or the like when the image is read, it is possible to read "0" and "1".

Based on numerical data of the embedded additional information, the additional information multiplexing unit 310 implements multiplexing by forming a pattern on an image. For example, as an example of embedding additional information in an image, a method of applying "0" and "1" alternately to an entire image of one-color gray image data will be described.

The size of a multiplexed image is 640 px in width and 480 px in height. As in FIGS. 11A and 11B, mask data is formed by 5 px×5 px. Note that FIG. 11A is defined as "0", and FIG. 11B is defined as "1".

For example, the mask data is defined by being divided into black blocks 1101, white blocks 1102, and diagonally shaded blocks 1103 in FIGS. 11A and 11B. The black blocks 1101 have +2, the white blocks 1102 have 0, and the diagonally shaded blocks 1103 have −1 as respective numerical values.

In a code to be described below, FIG. 11A is shown as "0" if maskA is true, and FIG. 11B is shown as "1" if mask A is false. Using the respective numerical values of the black, white, and diagonally shaded blocks in FIGS. 11A and 11B as mask data, a pseudo-code applied to the entire image is shown as follows.

Pseudo-Code:

```
1       int i, j, k, l;
2       int width = 640, height = 480;
3       unsigned char *data = image data;
4       int **maskA = mask data;
6       bool isMaskA = true;
5         for (j = 0; j < height; j+=5) {
```

-continued

```
6            for (i = 0; i < width; i+=5) {
7              for (k = 0; k < 5; k++) {
8                for (l = 0; l < 5; l++) {
                   if (isMaskA == true) {
9                    data [(i + k) + (j + l) *width] +=
maskA [k] [l];
                   }
10}
11}
12}
13}
```

As shown in the above-described pseudo-code, a mechanism for forming a pattern by dividing the entire image into blocks of 5 px×5 px and adding data of maskA for each block is adopted. The description has been given above by using the one-color gray image data. In a method of forming a pattern, however, there is also a case in which a pattern is to be formed so as to be less conspicuous to a human vision as much as possible. In the gray image data, the pattern has to be formed by a luminance component, and is thus visually conspicuous. It is known that a change in chromaticity component is less visually conspicuous than a change in luminance component though this depends on the shape or frequency component of a pattern to be formed.

Therefore, for example, color space conversion into YCbCr or the like, or Lab, Yuv, Lch, or the like is performed by using color image data having RGB components, dividing data into a luminance component and a chromaticity component. Then, mask data is applied to not the luminance component but the chromaticity component to form a pattern, making it possible to generate a visually less conspicuous image. Therefore, in this embodiment, a method using YUV will be described.

In this embodiment, the image is divided into the blocks of 5 px×5 px as a method of applying mask data. However, the present invention is not limited to such an arrangement. For example, the unit of another block size or another mask shape may be adopted. Any method may be used as long as a mechanism that allows the multiplexed printed product C to discriminate a pattern in shooting is adopted.

The additional information multiplexing unit 310 shoots the multiplexed printed product C and embeds additional information in image data such that the additional information can be extracted. The details of multiplexing processing by the additional information multiplexing unit 310 will be described later.

The multiplex parameter 315 is a parameter used by the additional information multiplexing unit 310. FIG. 7 is a table showing an example of a multiplex parameter. FIG. 7 shows a table that sets inputs as YUV, sets 256 tones for each color as 17 grids, and describes U application values corresponding to them (17×17×17=4913 grids). The U application values correspond to respective numerical values of a mask pattern in each of FIGS. 14A and 14B. A value between the grids is calculated by interpolation processing. Tetrahedron interpolation or the like may be used for the interpolation processing. The details of multiplexing processing by the multiplex parameter 315 will be described later.

Figure 4:
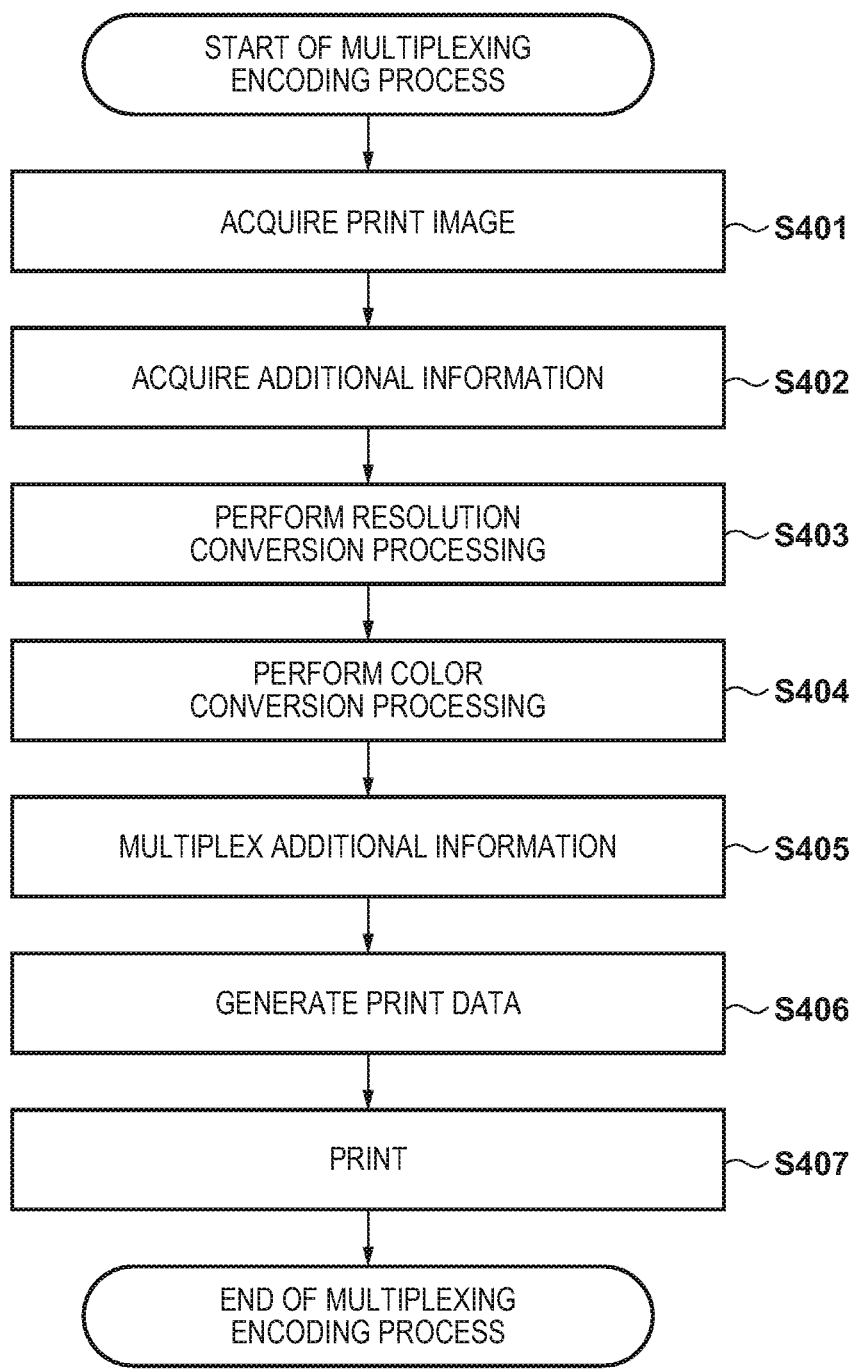
FIG. 4 is a flowchart showing the multiplexing encoding process.

The multiplexing encoding process will be described with reference to FIG. 4. FIG. 4 is a flowchart showing the multiplexing encoding process according to this embodiment. The process in FIG. 4 is implemented by, for example, causing the CPU 1902 to load a program stored in the ROM 1903 into the RAM 1904 and execute the program.

In step S401, the CPU 1902 acquires the image information A as a print image. A process in step S401 corresponds to a process by the attached information acquisition unit 301 and image data reconstruction unit 302 in FIG. 3. For example, the image information A is an image shot in advance by a camera-equipped mobile terminal (smartphone) and stored in a memory in the terminal in the JPEG format. The CPU 1902 decompresses an acquired JPEG image and generates 3-color and 8-bit RGB image data of a still image. In addition, the CPU 1902 may perform correction or processing on the acquired image by the image correction unit 303 of FIG. 3 as needed.

Then, in step S402, the CPU 1902 acquires the additional information B as data embedded in the print image. A process in step S402 corresponds to a process by the additional information 309 and additional information multiplexing unit 310 in FIG. 3. For example, text data that has undergone arbitrary key input by the smartphone is acquired. Note that the text data is, for example, numerical data obtained by assigning a number or a character to a numerical value by using character code shift JIS. The numerical data is transmitted to the additional information multiplexing unit 310 as the additional information 309 of FIG. 3.

Then, in step S403, the CPU 1902 performs resolution conversion processing on the acquired image information A from a paper sheet size and the resolution of a printer that are selected arbitrarily. A process in step S403 corresponds to a process by the resolution conversion unit 304 in FIG. 3. For example, if the selected paper sheet size is 2 L, resolution conversion is performed in accordance with the number of pixels of a resolution input to the printer 103. If the resolution input to the printer 103 is 600 dpi (dots per inch), for example, the number of pixels of the paper sheet size 2 L is set to 3,000 pixels×4,000 pixels. In this case, if the number of pixels of the acquired image information A is 1,500 pixels×2,000 pixels, resolution conversion is performed so as to double the number of pixels in each of the width and height. If the aspect ratio of an input image is not to be changed, resolution conversion is performed by making enlargement ratios and reduction ratios equal to each other in the width and height.

Then, in step S404, the CPU 1902 performs color conversion on the image data after the resolution conversion processing appropriately. A process in step S404 corresponds to a process by the color conversion unit 305 in FIG. 3.

Then, in step S405, the CPU 1902 performs a process of multiplexing the additional information on the image data after color conversion. A process in step S405 corresponds to a process by the additional information multiplexing unit 310 in FIG. 3. The details of the additional information multiplexing unit 310 will be described later.

Then, in step S406, the CPU 1902 performs, in accordance with the number of tones, tone conversion on image data obtained by applying density correction to an image obtained by converting image data into an ink color, generating print data. A process in step S406 corresponds to a process by the ink color conversion unit 306, density correction unit 307, and tone conversion unit 308 in FIG. 3.

Then, in step S407, the CPU 1902 transmits the image that has undergone tone conversion to the print engine shown in FIG. 3. In the print engine, inks of respective colors are applied to a printing medium in accordance with the image that has undergone tone conversion, the printed product C is generated, and then the process in FIG. 4 ends.

Figure 5:
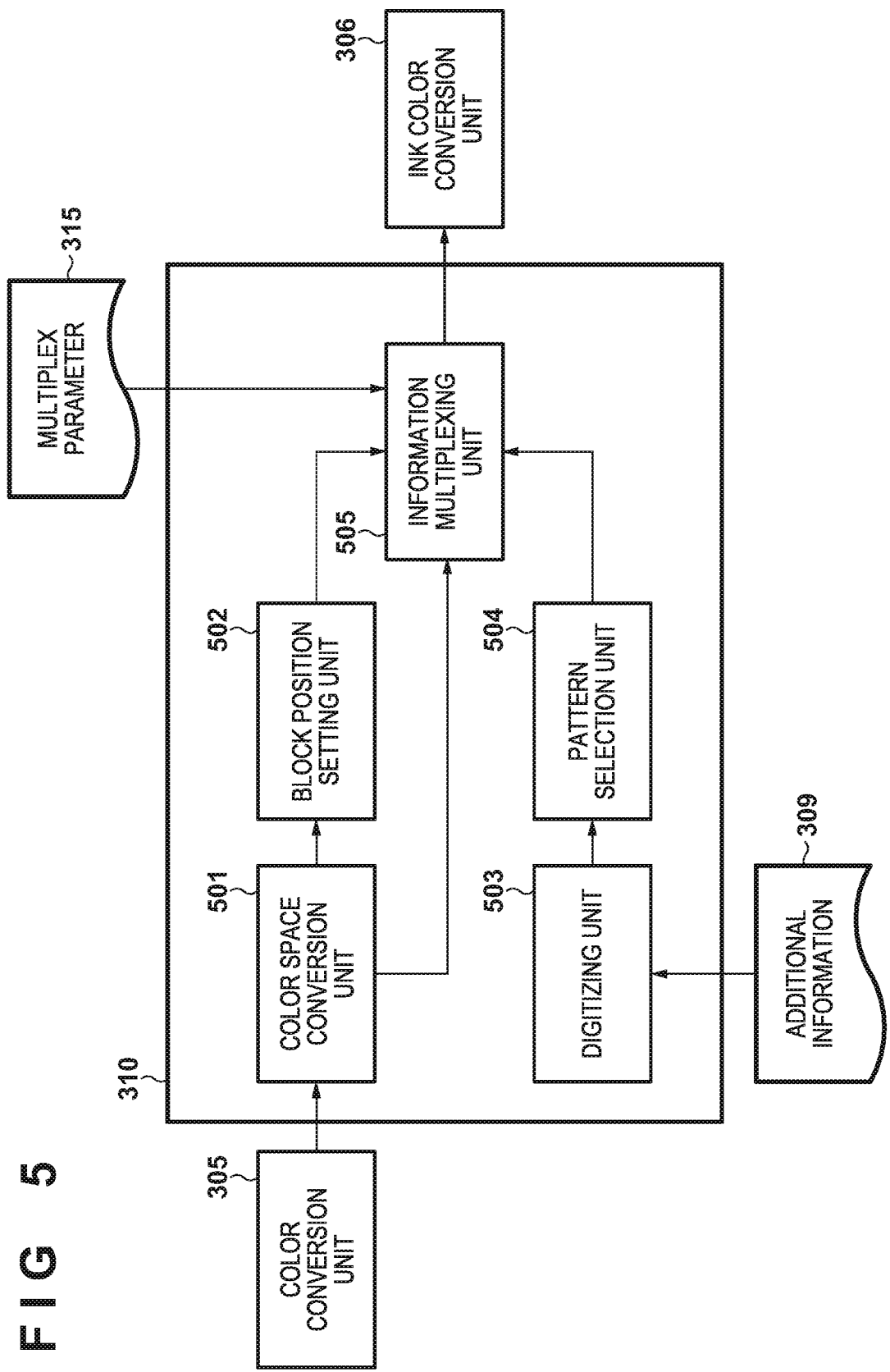
FIG. 5 is a block diagram showing the block arrangement of firmware in additional information multiplexing processing.

The additional information multiplexing unit 310 of FIG. 3 and the process in step S405 of FIG. 4 will be described with reference to FIG. 5. FIG. 5 is a block diagram showing the block arrangement of firmware in additional information multiplexing processing according to this embodiment. Each processing unit shown in FIG. 5 will be described.

A color space conversion unit 501 is a processing unit that performs conversion into a color space in which information multiplexing is performed on the image data that has undergone color conversion by the color conversion unit 305. For example, if a color space in which information multiplexing is performed is U of YUV, and a color space of an input image is RGB, an RGB color space is converted into a YUV color space by:

$$Y=0.299 \times R+0.587 \times G+0.114 \times B \quad (1)$$

$$U=-0.169 \times R-0.331 \times G+0.500 \times B \quad (2)$$

$$V=0.500 \times R-0.419 \times G-0.081 \times B \quad (3)$$

In this embodiment, a description will be given by using a U plane. However, the same also applies to Y and V. In this embodiment, additional information is embedded by dividing image data to be printed into a plurality of block regions and forming a pattern by a density modulation for each pixel on a block basis.

A block position setting unit 502 is a processing unit that acquires the image data after color space conversion and in accordance with the size of one designated block, sets position coordinates of the block for an image of a designated color plane. For example, the image size of a U-color plane of YUV is 640 px in width and 480 px in height, and the block size is 5 px in width and 5 px in height. In this case, the number of blocks in width is 128 which is obtained by 640÷5=128, and the number of blocks in height is 96 which is obtained by 480÷5=96. The total number of blocks is 12,288 which is obtained by 128×96=12,288. Setting is made by, for example, defining upper left coordinates of each block as a block position.

A digitizing unit 503 is a processing unit that receives the additional information 309 and converts the additional information 309 into digitized data. For example, the additional information 309 is a character string of the shift JIS. The digitizing unit 503 holds a conversion map in which a character and a numerical value correspond to each other in a shift JIS format in advance and performs data conversion of the character string into a numeric string. In the case of the character string "hello", the converted numeric string becomes "0110100001100101011011000110001101111".

A pattern selection unit 504 is a processing unit that registers a mask pattern for performing a density modulation for each pixel and selects a mask pattern to be applied to data obtained by digitizing the additional information 309 by the digitizing unit 503 on a block basis.

FIGS. 14A and 14B are conceptual views obtained by digitizing mask patterns different in frequency characteristic. For example, setting 5 px in width and 5 px in height as one block, each of FIGS. 14A and 14B is used as a mask pattern of one block. FIG. 14A is used if a multiplexed numerical value is "0". FIG. 14B is used if a multiplexed numerical value is "1". That is, one bit of "0" or "1" can be expressed for each block.

An information multiplexing unit 505 acquires the image data that has undergone color space conversion by the color space conversion unit 501 and acquires the position of each block set by the block position setting unit 502. Further, the information multiplexing unit 505 acquires a mask pattern for each numerical value selected by the pattern selection unit 504. Furthermore, the information multiplexing unit 505 acquires the multiplex parameter 315. The information multiplexing unit 505 is a processing unit that generates an image obtained by applying the mask pattern to the image data from the respective pieces of acquired information.

When a printed product is shot, the entire image thereof cannot always be shot. Therefore, the same data is embedded in a plurality of portions so that additional information can be extracted even if only a part of the printed product is shot. For example, assuming that the number of blocks in the entire image is 12,288 blocks, and the unit of one piece of additional information is 96 blocks, the same data is embedded by dividing the image into 128 regions which are obtained by 12,288÷96=128. That is, the image data is divided into 128 regions. One region includes 96 blocks having 5 px in width and 5 px in height as one block. The 96 blocks are treated as one piece of additional information, making it possible to set 96-bit additional information. However, the head of characters includes 8 bits of "11111111" which is not expressed as a character in the shift JIS such that a start position of 96 bits can be grasped. Therefore, it becomes possible to define data of 96-8=88 bits as additional information.

A numeric string of "0" and "1" set by the digitizing unit 503 is defined as data falling within 88 bits. A numerical value is defined for each block, and a mask pattern is selected in accordance with the numerical value. Furthermore, a numerical value for each pixel is decided in accordance with a numerical value in the mask pattern.

Assume that, for example, all YUV values of one block (5 px×5 px) in the image that has undergone color space conversion by the color space conversion unit 501 are Y:0, U:−112, and V:0. In this case, when the U value is converted in accordance with the multiplex parameter 315 in FIG. 7, −112 is obtained if the mask pattern is "0", −102 is obtained if the mask pattern is "2", and −122 is obtained if the mask pattern is "−1". That is, the U value is changed to one of 1112, −102, and −122 and has a predetermined cycle depending on the mask pattern in the block of 5 px×5 px embedded with the same U value of −112.

In this embodiment, multiplexing is implemented by adding a value obtained by multiplying the numerical value and reference value of a mask pattern applied for each pixel. A method of applying the mask pattern is not limited to such an arrangement as long as a method of changing a value capable of changing a frequency on a block basis on the U plane is adopted. For example, instead of a table such as the multiplex parameter 315, a value obtained by multiplying the U value of YUV and the numerical value of the mask pattern may be used.

The multiplexing encoding process has been described above. Concerning the above-described multiplexing encoding process, processing contents by the additional information multiplexing apparatus 102 in FIG. 1A and processing contents by the additional information multiplexing unit 105 in FIG. 1B are shown.

As shown in FIGS. 1A and 1B as well, the printer 103 may include or may not include the processing unit that performs the multiplexing encoding process. Both the arrangements of FIGS. 1A and 1B may be used as long as the additional information multiplexing apparatus 102 or the additional information multiplexing unit 105 can transmit a generated multiplex image after the multiplexing encoding process to the printer 103 and the printing unit 106.

<Description of Multiplexing Decoding Process>

Figure 8:
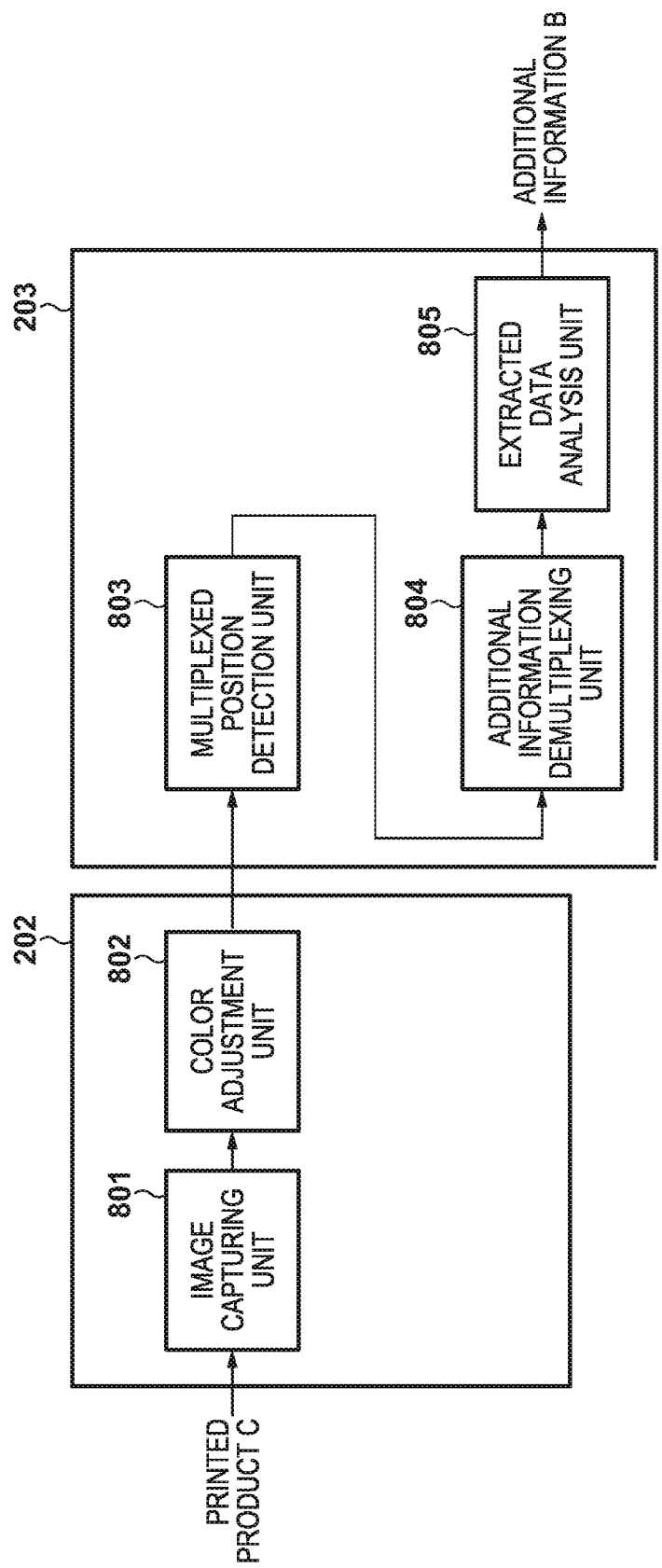
FIG. 8 is a block diagram showing the block arrangement of firmware in the multiplexing decoding process.

FIG. 8 is a block diagram showing the block arrangement of basic firmware in a multiplexing decoding process according to this embodiment. A process to be described below is performed, extracting additional information embedded in a printed product. Each processing unit shown in FIG. 8 will be described.

The image capturing sensor 202 includes an image capturing unit 801 and a color adjustment unit 802. The additional information demultiplexing apparatus 203 includes a multiplexed position detection unit 803, an additional information demultiplexing unit 804, and an extracted data analysis unit 805. In this embodiment, data of digitized additional information such as test data, voice data, moving image data, and the like are added as a pattern shape on the printed product C. The additional information will be described assuming that, for example, the same information is added repeatedly for each region on the entire printed product C. The image capturing unit 801 converts the printed product C that has undergone the multiplexing encoding process into captured image data by an imaging element in the image capturing sensor 202 of FIG. 2.

Figure 9:
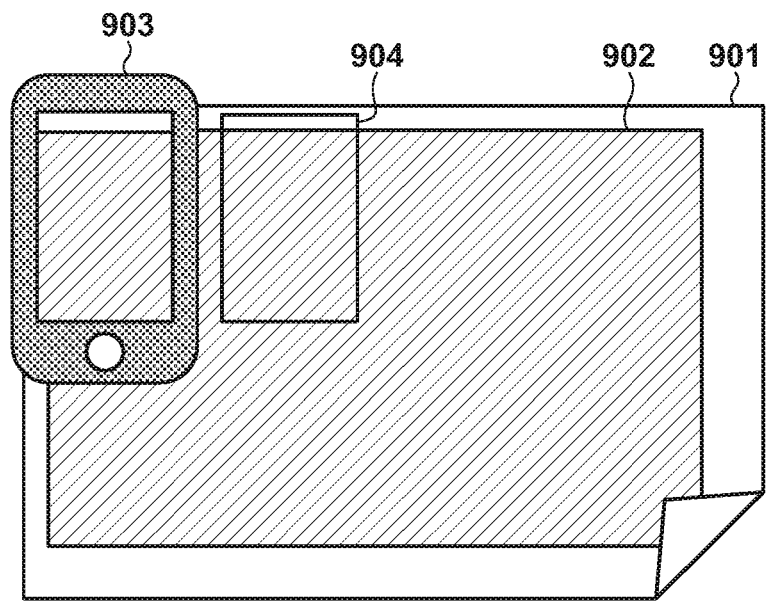
FIG. 9 is a view showing a concept that a printed product that has undergone the multiplexing encoding process is shot.

FIG. 9 is a view showing a concept that a printed product that has undergone the multiplexing encoding process is shot by a camera-equipped mobile terminal. In FIG. 9, a printed product 901 indicates a printed product that corresponds to the printed product C and has undergone the multiplexing encoding process on a printing medium. A region 902 indicates a region that has undergone the multiplexing encoding process in a print region of the printed product 901. A terminal 903 indicates an apparatus that has a function corresponding to the camera-equipped mobile terminal 201. A region 904 indicates a region shot by the camera-equipped mobile terminal 903.

For example, in the image capturing unit 801, the camera-equipped mobile terminal 903 shoots the shot region 904 in the region 902 that has undergone multiplexing encoding process in the printed product 901 that has undergone the multiplexing encoding process, as shown in FIG. 9.

The the imaging element in the image capturing sensor 202 is, for example, a CCD. Concerning the imaging element CCD, a technology is already known, and thus the details of which will be omitted. Describing an outline, the CCD can sense light by a light-receiving element called a photodiode and change the light into a voltage. At this time, the CCD can convert the light into color data by passing it through a color filter of RGB, CMY, or the like arranged for each element. A shot sensor value is sent to the color adjustment unit 802.

The color adjustment unit 802 converts a sensor value extracted by the photodiode in the image capturing unit 801 into image data as, for example, 8-bit data of one pixel of YUV. The color adjustment unit 802 also performs color adjustment processing generally performed at the time of shooting, such as white balance or brightness adjustment.

The multiplexed position detection unit 803 acquires image data obtained by shooting and performing color adjustment on a multiplexed printed product. The multiplexed position detection unit 803 acquires a frequency characteristic for the acquired image data. The multiplexed position detection unit 803 detects a multiplexed position by determining the acquired frequency characteristic.

Figure 12:
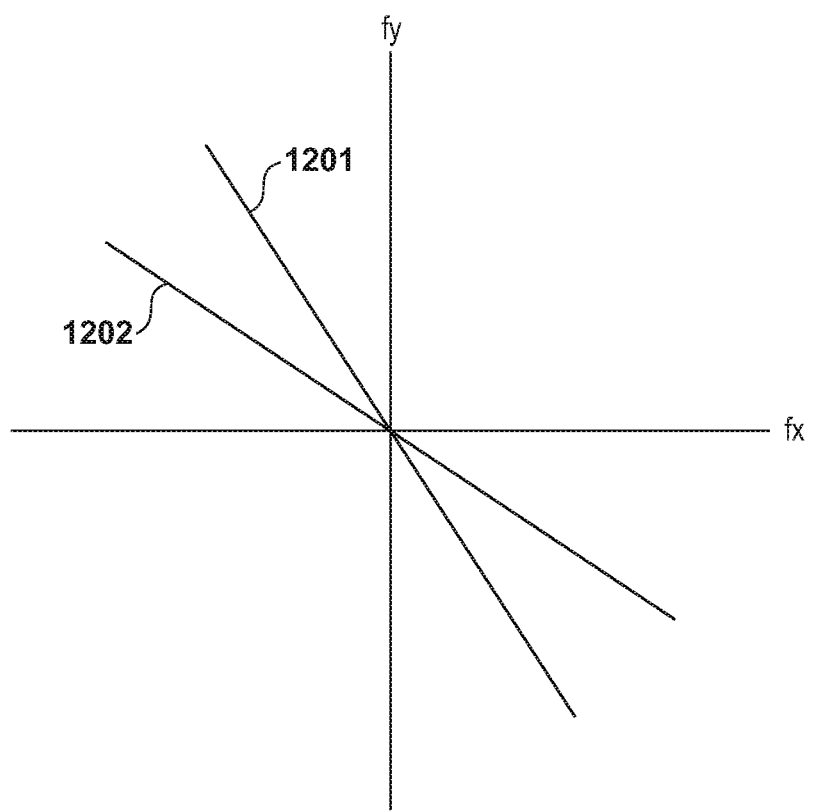
FIG. 12 is a graph showing a difference in frequency characteristic in a two-dimensional frequency domain.

FIG. 12 is a schematic graph showing a difference in frequency characteristic in a two-dimensional frequency domain. The abscissa represents the frequency in the horizontal direction, and the ordinate represents the frequency in the vertical direction. The origin at the center indicates a DC component. The frequency rises as it moves apart from the origin. In this embodiment, the frequency characteristic of a U component of YUV in the multiplexed printed product is changed by switching the mask patterns of FIGS. 14A and 14B.

For example, with a change in characteristic of the U component by FIG. 14A, a large power spectrum is generated on a frequency vector on a line 1201 in FIG. 12. In addition, with a change in characteristic of the U component by FIG. 14B, a large power spectrum is generated on a frequency vector on a line 1202 in FIG. 12. When demultiplexing additional information, it is possible to determine a multiplexed signal by detecting a frequency vector on which a large power spectrum is generated.

FIGS. 14A and 14B correspond to HPFs (High Pass Filters) each having the directionality of a specific frequency vector. FIGS. 14A and 14B are also used as spatial filters when the frequency vector is detected. That is, the spatial filter shown in FIG. 14A can enhance the frequency vector on the line 1201, and the spatial filter shown in FIG. 14B can enhance the frequency vector on the line 1202.

For example, assume that a large power spectrum is generated now on the frequency vector on the line 1201 in FIG. 12 by the mask pattern shown in FIG. 14A. In this case, a change amount of the power spectrum is amplified in the spatial filter shown in FIG. 14A but is hardly amplified by the spatial filter shown in FIG. 14B. That is, when a plurality of spatial filters parallelly perform filtering, the power spectrum is amplified only by a spatial filter coincident with the frequency vector, and is hardly amplified by other filters. Thus, a frequency vector on which a large power spectrum is generated can easily be determined.

The frequency vector is detected by the U component of YUV when the additional information of the multiplexed printed product is demultiplexed by changing the frequency characteristic in the U component. It is impossible, however, to demultiplex the additional information if the U component is lost. When the characteristic shifts to a Y component or a V component other than the U component, it is possible to demultiplex the additional information if the frequency characteristic is determined by the Y component or the V component. However, it takes more time than in a case in which only the U component is analyzed.

As described above, it becomes possible to extract data by determining the frequency characteristic. However, if a position to be extracted deviates when the frequency characteristic is determined, it becomes difficult to extract the data correctly.

Figure 16A:
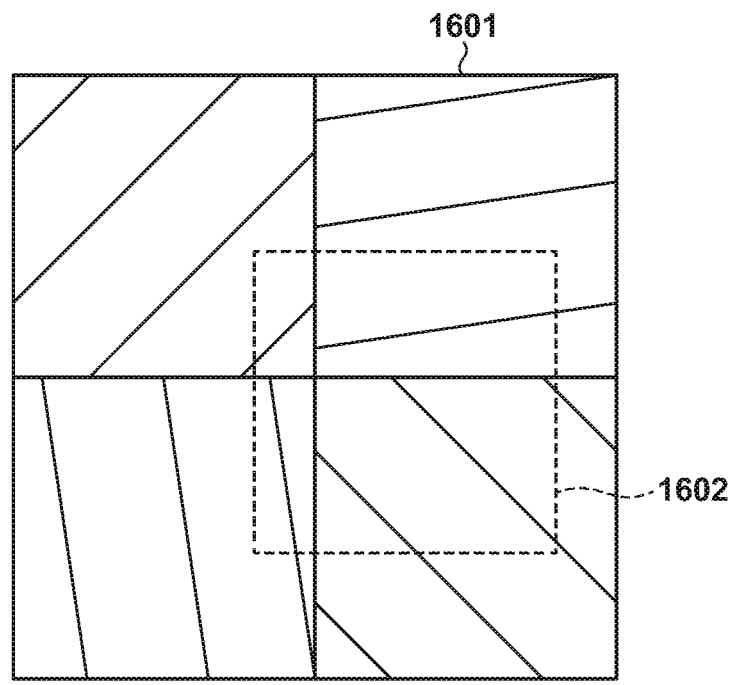
FIGS. 16A and 16B are views each for explaining a block detection position.
Figure 16B:
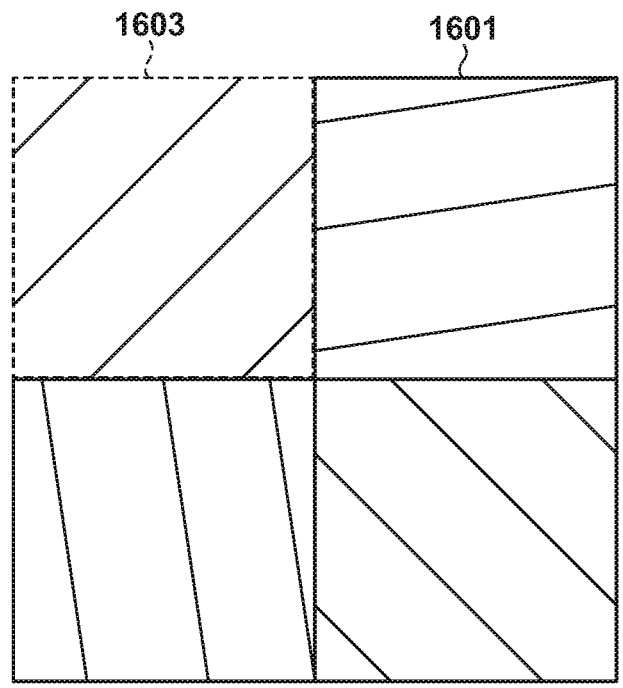

FIGS. 16A and 16B are views each for explaining a detection position when the frequency characteristic is determined. An image 1601 indicates an image multiplexed in four blocks of a printed product. Regions 1602 and 1603 indicate regions where a frequency characteristic is determined on a block basis. In FIGS. 16A and 16B, the region 1602 indicates a deviation from the positions of the multiplexed blocks, and the region 1603 indicates a match with the position of the multiplexed block. In this case, it is possible to specify a predetermined frequency correctly in the region 1603, but it becomes difficult to specify the predetermined frequency in the region 1602 because the power spectrum of a specific frequency vector is decreased.

The multiplexed position detection unit 803 detects a block position based on whether the power spectrum of the specific frequency vector is strong or weak. Therefore, the multiplexed position detection unit 803 determines the frequency characteristic while shifting the block position with respect to acquired image data after image capturing and detects the positions of the multiplexed blocks.

With reference to the positions detected by the multiplexed position detection unit 803, the additional information demultiplexing unit 804 uses a result of determining the frequency characteristic to extract multiplexed additional information.

Figure 15:
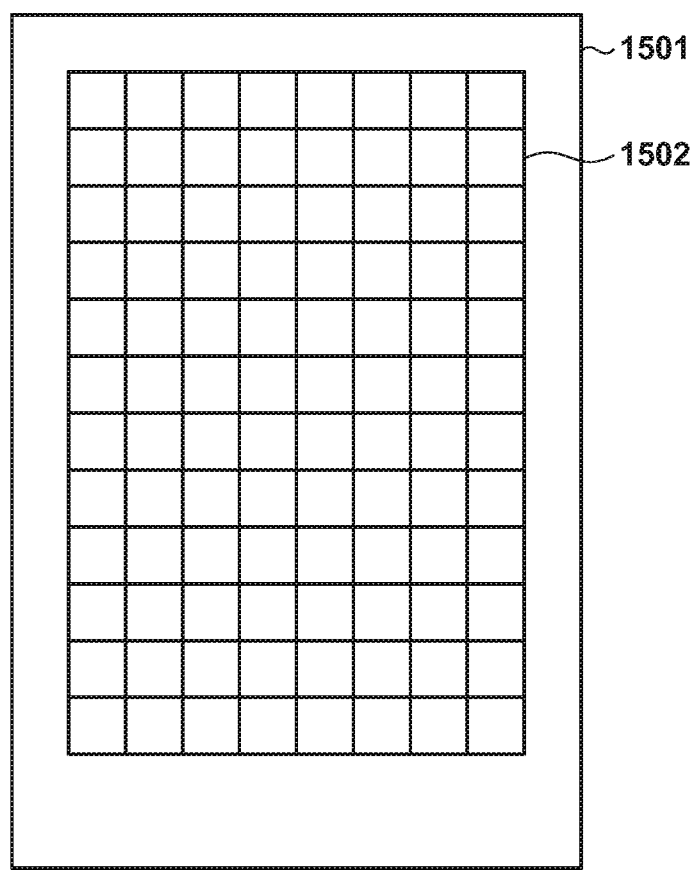
FIG. 15 is a view showing a state in which multiplexing is performed for each block on a printing paper sheet.

FIG. 15 is a view showing a state in which multiplexing is performed for each block on a printing paper sheet. In FIG. 15, a printing paper sheet 1501 indicates a printing paper sheet, and blocks 1502 indicate multiplexed blocks. The number of multiplexed blocks is 8 blocks in the width and 12 blocks in the height, that is, 96 blocks in total. In FIG. 15, "0" and "1" of additional information are embedded in a multiplexing encoding process for each block.

For example, if the power spectrum of the frequency vector on the line 1201 in FIG. 12 exceeds a certain threshold, data "0" is determined. If the power spectrum of the frequency vector on the line 1202 exceeds the certain threshold, data "1" is determined. With reference to the positions detected by the multiplexed position detection unit 803, the frequency characteristic is determined while shifting the positions by the 96 blocks on a block basis. In this case, one bit of "0" or "1" can be determined for each block, making it possible to extract data of the 96 bits in total. As described above, it is possible to extract multiplexed data by determining the frequency characteristic while shifting the positions.

The extracted data analysis unit 805 is a processing unit that analyzes data with respect to a numeric string demultiplexed as additional information by the additional information demultiplexing unit 804 and converts it into the format of additional information embedded originally. For example, additional information multiplexed in advance is a value obtained by digitizing a character code by the "shift JIS" as text data.

In a single-byte code (one-byte character) of the shift JIS, conversion corresponding to a numerical value and a character can be performed in the combination of upper 4 bits and lower 4 bits. For example, if the upper 4 bits are "0100", and the lower 4 bits are "0001", "A" is determined as a character string. It is thus possible to perform conversion into a character by holding a conversion map in advance and associating a numeric string with it.

A numeric string demultiplexed as additional information is temporarily held in the RAM 206 of FIG. 2 to make it possible to refer to a "shift JIS" conversion map held in advance in the secondary storage device 207.

For example, a numeric string of additional information demultiplexed by the additional information demultiplexing unit 804 is "0110100001100101011 01100011011 0001101111". In this case, if the numeric string is associated with a conversion map, a result is as follows. A character "h" is obtained if the upper 4 bits are "0110", and the lower 4 bits are "1000". A character "e" is obtained if the upper 4 bits are "0110", and the lower 4 bits are "0101". A character "l" is obtained if the upper 4 bits are "0110", and the lower 4 bits are "1100". The character "l" is obtained if the upper 4 bits are "0110", and the lower 4 bits are "1100". A character "o" is obtained if the upper 4 bits are "0110", and the lower 4 bits are "1111". Hence, "hello" is extracted as the character string.

When additional information is extracted, for example, an extracted character string is displayed on the display 208 of FIG. 2. If an extracted character string is a URL (Uniform Resource Locator), a network is connected by the network interface 210, and a screen of a URL destination is displayed on the display 208 by using a browser. If the URL is a moving image site, a moving image is displayed on the display 208, and a voice is output by the loudspeaker 211.

FIG. 10 is a flowchart showing the multiplexing decoding process according to this embodiment. The process in FIG. 10 is implemented by, for example, causing the CPU 204 to load a program stored in the ROM 205 into the RAM 206 and execute the program.

In step S1001, the CPU 204 shoots the multiplexed printed product C by the image capturing sensor 202. The image capturing sensor 202 transmits a sensor value obtained by converting shot light into a color data value to the color adjustment unit 802. A process in step S1001 corresponds to a process of acquiring a shot image by the image capturing sensor of the image capturing unit 801 in FIG. 8.

In step S1002, the CPU 204 performs color adjustment of the acquired shot image. The color adjustment unit 802 receives the color data value from the image capturing unit 801, performs white balance adjustment, and generates color data that has undergone while balance adjustment as image data. The color adjustment unit 802 transmits the generated image data to the additional information demultiplexing apparatus 203. Alternatively, the generated image data is stored in the secondary storage device 207 of FIG. 2. A process in step S1002 corresponds to a process of generating an image that has undergone white balance color adjustment by the color adjustment unit 802 in FIG. 8.

In step S1003, the CPU 204 receives the image data after white balance from the color adjustment unit 802 or acquires the image data stored in the secondary storage device 207 of FIG. 2. The multiplexed position detection unit 803 determines a frequency characteristic for the acquired image data and detects a multiplexed position. A process in step S1003 corresponds to a process of detecting a multiplexed reference position from image data by the multiplexed position detection unit 803 in FIG. 8.

In step S1004, the CPU 204 determines whether the multiplexed reference position can be detected from the image data by the multiplexed position detection unit 803. If the CPU 204 determines that the position can be detected, the process advances to step S1005. If the CPU 204 determines that the position cannot be detected, the process in step S1001 is repeated.

In step S1005, based on the image data generated by the color adjustment unit 802 and the multiplexed reference position detected by the multiplexed position detection unit 803, the CPU 204 extracts multiplexed additional information as numerical data by using a result of determining the frequency characteristic. A process in step S1005 corresponds to a process of extracting additional information from image data by the additional information demultiplexing unit 804 in FIG. 8. The additional information demultiplexing unit 804 transmits the extracted numerical data to the extracted data analysis unit 805 of FIG. 8. Alternatively, the additional information demultiplexing unit 804 stores the extracted numerical data in the RAM 206 of FIG. 2 temporarily and notifies the extracted data analysis unit 805 of this.

In step S1006, the CPU 204 causes the extracted data analysis unit 805 of FIG. 8 to acquire numerical data corresponding to demultiplexed additional information, analyze the numerical data, and convert the numerical data into additional information such as character data. A process in step S1006 corresponds to a process of extracting additional information by the extracted data analysis unit 805 in FIG. 8.

In step S1007, the CPU 204 determines whether acquisition of the additional information extracted by the extracted data analysis unit 805 of FIG. 8 is complete. If the CPU 204 determines that acquisition of the additional information is complete, it terminates the multiplexing decoding process in FIG. 10. If the CPU 204 determines that the acquisition is not complete, the process in step S1001 is repeated.

If additional information can be extracted from a multiplexed printed product, a result is displayed on the display 208 of FIG. 2 or the like, or access to network is made. If the additional information cannot be extracted from the multiplexed printed product, it is considered a case in which, for example, shot image data do not include all regions enough to extract additional information. In this case, data is not complete because only a part of the additional information can be extracted, and shooting need to be performed again.

In order to determine whether additional information can be extracted, for example, the additional information itself may include a value indicating a data amount of the additional information. Then, the data amount of the additional information may be determined by extracting the data amount. If it is determined whether the data amount or character data is obtained, it is possible to extract the data amount by, for example, deciding the combination of numeric strings and deciding several bits immediately after the numeric strings as the data amount in advance.

If only a part of additional information can be extracted, for example, contents that can be extracted may be stored in the secondary storage device 207 of FIG. 2 and combined with additional information when additional contents can be extracted. That is, the additional information may be extracted divisionally a plurality of times. The CPU 204 determines in step S1007 whether acuisition of the extracted data is complete. However, additional information may be displayed from additional information that can be extracted on the display of the FIG. 2 or the like.

The arrangement of this embodiment has been described above. An example of this embodiment will be described below. In this embodiment, multiplexing processing by the additional information multiplexing unit 310 is performed after the color conversion unit 305 of FIG. 3. As already described, this is because the color conversion unit 305 performs color conversion into a device color space (DeviceRGB or the like) considering color reproducibility of ink or media of a printer. FIG. 13 is a graph showing an example of color conversion. For the sake of descriptive simplicity, the two-dimensional plane of a and b of a Lab color space will be described. A color space 1301 represents a state in which an sRGB color space before color conversion is converted into the Lab color space. A color space 1302 represents a state in which a DeviceRGB color space of predetermined ink and media of the printer is converted into the Lab color space. That is, the color conversion unit 305 converts colors of A, B, and C before color conversion into A', B', and C' after color conversion.

If "−1", "0", and "2" of a mask pattern embedded with the U component (YUV) after color conversion are set as A, B, and C in an a*component (Lab) before color conversion, respective distances between A', B', and C' become short by color conversion. This indicates that if multiplexing processing is performed before color conversion, the determination of a frequency characteristic may fail when additional information is demultiplexed, making it impossible to demultiplex the additional information.

In this embodiment, multiplexing can be performed such that a color modulation is implemented in an output color space when additional information is embedded in an image. As a result, it is possible to prevent a case in which additional information cannot be extracted from a printed product as described above.

Second Embodiment

Figure 17:
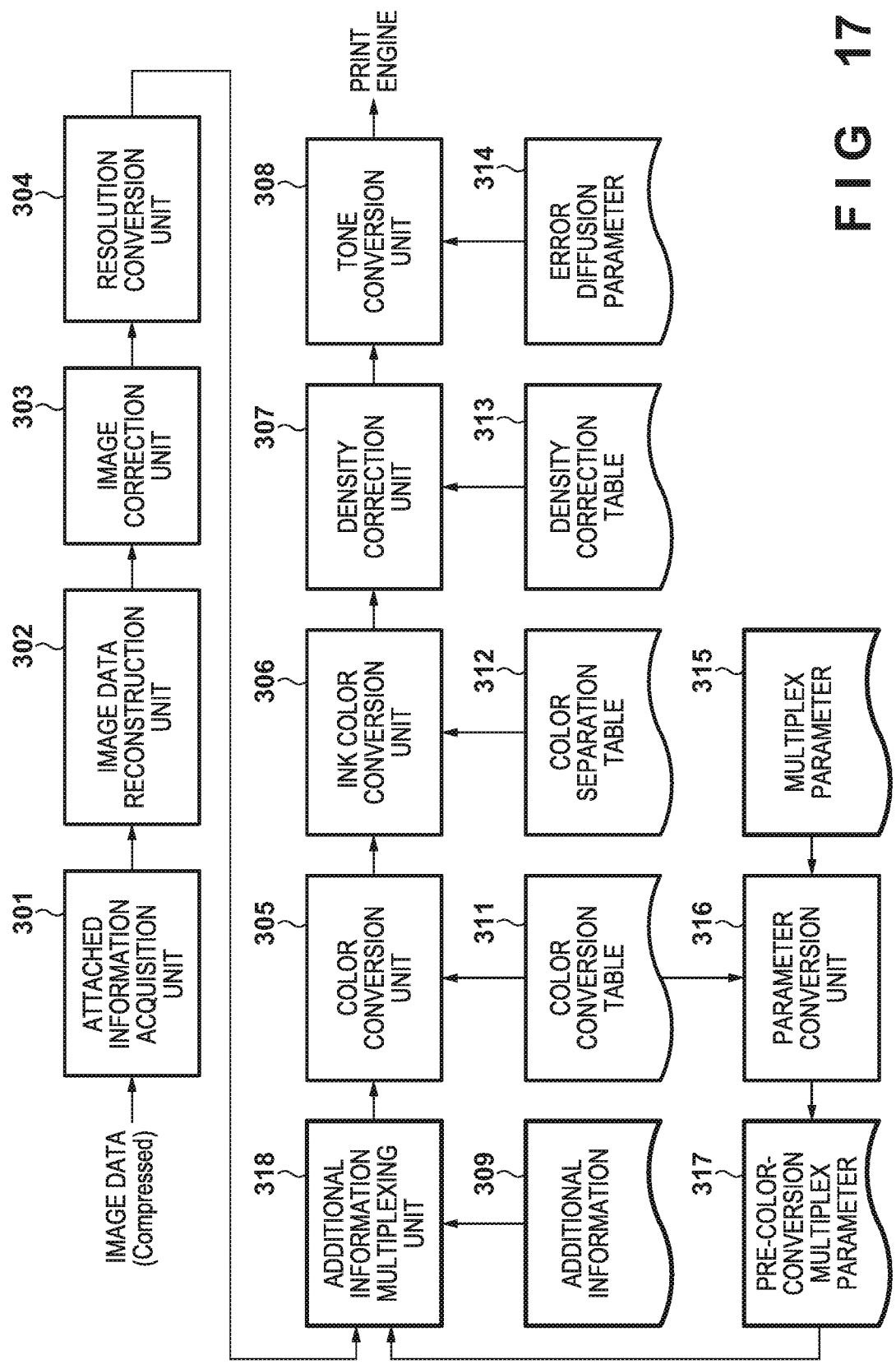
FIG. 17 is a block diagram showing the block arrangement of firmware in a multiplexing encoding process.

The second embodiment will be described below concerning a point different from the first embodiment. FIG. 17 is a block diagram showing the block arrangement of basic firmware in a multiplexing encoding process according to this embodiment. If constituent elements are denoted by the same reference numerals as in the block diagram of FIG. 3, they are the same as in a description in FIG. 3, and thus a description thereof will be omitted.

In this embodiment, multiplexing processing is processed at the preceding stage of a color conversion unit 305. As already described, a multiplexed frequency characteristic may be lost if color conversion is performed after multiplexing processing is performed. Therefore, in this embodiment, multiplexing processing is performed by using a pre-color-conversion multiplex parameter 317 created by converting a multiplex parameter 315 with a parameter conversion unit 316. As a result, it is possible to prevent a loss of the frequency characteristic even if color conversion is performed after multiplexing processing.

For example, when input YUV values are (144, −64, −96) in the multiplex parameter 315 of FIG. 7, YUV values after a U application value is applied become (144, −64, −96), (144, −54, −96), and (144, −74, −96), respectively, for "0", "2", and "−1". (9, 235, 31), (9, 231, 48), and (9, 238, 13) are obtained if these are converted into RGB values by:

$$R = Y + 1.402 \times V \quad (4)$$

$$G = Y - 0.344 \times U - 0.714 \times V \quad (5)$$

$$B = Y + 1.772 \times U \quad (6)$$

RGB values before color conversion are calculated by using the parameter conversion unit 316 and a color conversion table 311. A general method may be used for a method of calculating the RGB values before color conversion. For example, when a color conversion table is used, it is possible to calculate the RGB values before color conversion by performing inverse conversion in accordance with a mapping method by the color conversion table or performing interpolation processing such as tetrahedral interpolation on RGB values after color conversion of the color conversion table.

(5, 250, 27), (6, 249, 40), and (9, 250, 3) are obtained by calculating the RGB values before color conversion from the RGB values after color conversion with the above-described example. It is possible to create the pre-color-conversion multiplex parameter 317 as shown in FIG. 20 by performing conversion as described above on 4913-grid YUV values of the multiplex parameter 315 in FIG. 7, and calculating and tabulating three RGB values before color conversion.

Figure 18:
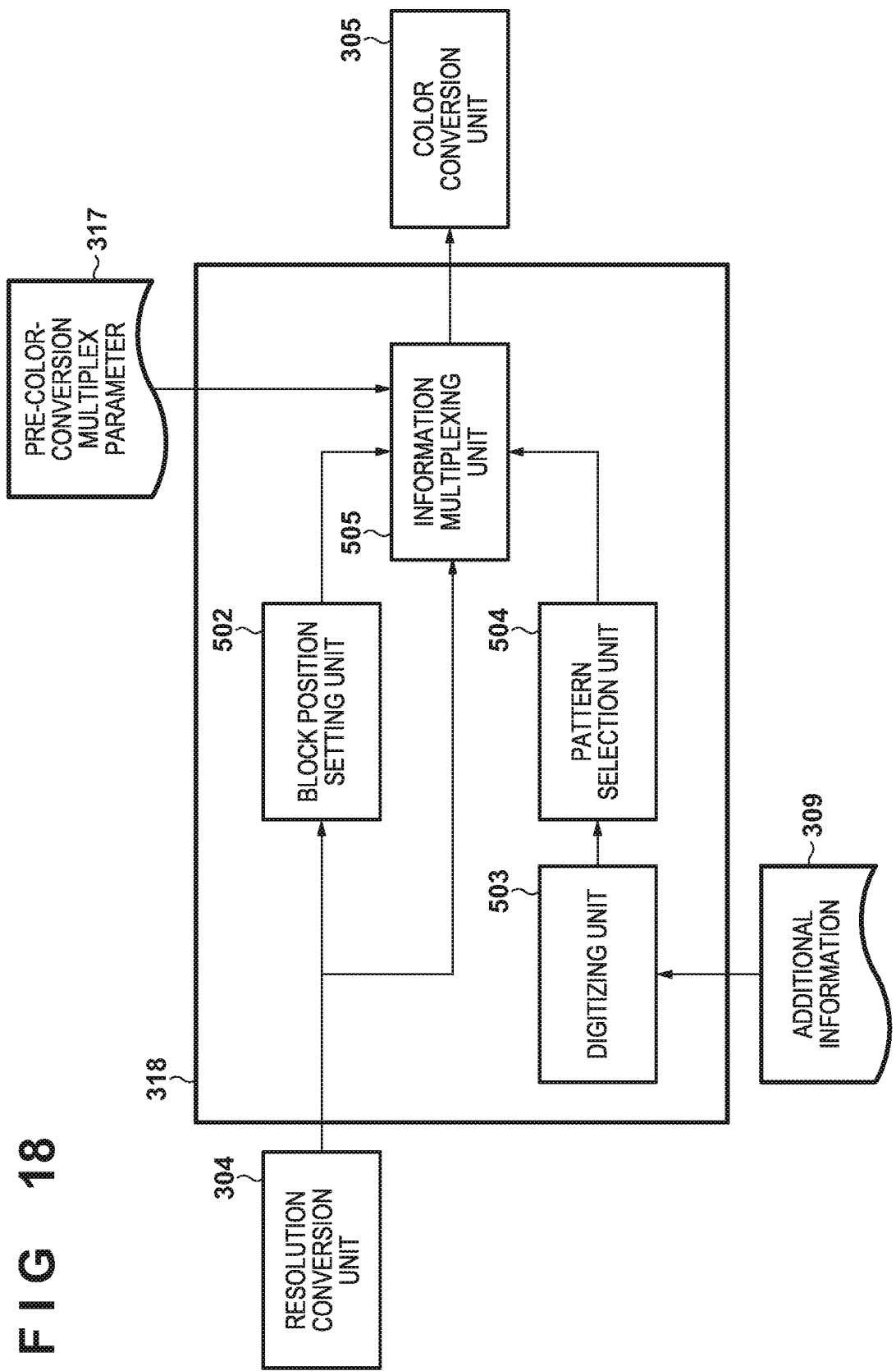
FIG. 18 is a block diagram showing the block arrangement of firmware in additional information multiplexing processing.

Multiplexing processing in this embodiment will be described with reference to FIG. 18. In the first embodiment, the color space conversion unit 501 performs color conversion from an RGB image to a YUV image. In this embodiment, however, the RGB image is used. That is, a multiplexed image is created by performing the operations of a block position setting unit 502 and an information multiplexing unit 505 on respective planes of R, G, and B without performing color space conversion. Subsequently, the RGB values of a mask pattern become (9, 235, 31), (9, 231, 48), and (9, 238, 13), respectively, by performing color conversion with the color conversion unit 305. Then, YUV values at this time become (144, −64, −96), (144, −54, −96), and (144, −74, −96).

As described above, according to this embodiment, a multiplexed color modulation is not lost even if multiplexing processing is performed on the RGB image before color conversion, making it possible to extract additional information from a printed product appropriately. Note that this embodiment may be arranged in combination with the first embodiment. In this case, this embodiment may be arranged so as to have the arrangement of each processing unit in FIG. 3 and the arrangement of each processing unit in FIG. 17 and perform an operation of one of the first embodiment and the second embodiment selectively.

In this embodiment, the pre-color-conversion multiplex parameter 317 is created by performing conversion from the multiplex parameter 315. However, the multiplex parameter 317 that has already been created in advance may be held in a storage unit such as a ROM 1903, and multiplexing processing may be performed by reading out the held multiplex parameter 317 when multiplexing processing is performed. In this embodiment, multiplexing processing is performed in a RGB color space. However, multiplexing processing may be performed on another color space, for example, on a CMYK space.

For example, in a printing press for offset printing or the like, processing is performed on the CMYK color space at the time of color conversion. Nonlinear color conversion is also performed in CMYK color conversion, and thus a frequency characteristic is lost as in RGB. It is therefore possible to implement the operation of this embodiment by calculating CMYK values before color conversion as in the case of RGB. It is also possible to implement the operation of this embodiment in a case in which RGB and CMYK are converted into a color space of Lab, YUV, YCbCr, Lch, or the like in accordance with a predetermined arithmetic expression.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126521, filed Jun. 28, 2017, which is hereby incorporated by reference herein in its entirety.

What is claimed is:

1. An information processing apparatus comprising:
   at least one processor configured to:
      acquire first image data having values corresponding to R, G, and B defined by a first color space that does not depend on an output device to output an image based on the first image data by printing the image on a print medium using a printing material;
   the at least one processor being configured to perform a first processing flow or a second processing flow selectively;
   wherein, in the first processing flow, the at least one processor is configured to:
      convert the first image data into second image data having values corresponding to R, G, and B defined by a second color space that depends on the output device, using a table defining a conversion from the first color space to the second color space;
      convert the second image data into third image data defined by a color space in which multiplexing of additional information is to be performed;
      multiplex, by using a first multiplex parameter, the additional information on the third image data; and
      convert the third image data into values corresponding to the printing material to be used for printing the image on the print medium, and
   wherein, in the second processing flow, the at least one processor is configured to:
      perform inverse-conversion of the table on the first multiplex parameter to generate a second multiplex parameter;
      multiplex, by using the second multiplex parameter, the additional information on the first image data to generate fourth image data;
      convert the fourth image data into fifth image data having values corresponding to R, G, and B defined by the second color space, using the table; and
      convert the fifth image data into values corresponding to the printing material to be used for printing the image on the print medium.

2. A method performed in an information processing apparatus comprising:
   acquiring first image data having values corresponding to R, G, and B defined by a first color space that does not depend on an output device to output an image based on the first image data by printing the image on a print medium using a printing material; and
   selectively performing a first processing flow or a second processing flow,
   wherein the first processing flow comprises:
      converting the first image data into second image data having values corresponding to R, G, and B defined by a second color space that depends on the output device, using a table defining a conversion from the first color space to the second color space;

converting the second image data into third image data defined by a color space in which multiplexing of additional information is to be performed;

multiplexing, by using a first multiplex parameter, the additional information on the third image data; and converting the third image data into values corresponding to the printing material to be used for printing the image on the print medium, and wherein the second processing flow comprises:

performing inverse-conversion of the table on the first multiplex parameter to generate a second multiplex parameter;

multiplexing, by using the second multiplex parameter, the additional information on the first image data to generate fourth image data;

converting the fourth image data into fifth image data having values corresponding to R, G, and B defined by the second color space, using the table; and converting the fifth image data into values corresponding to the printing material to be used for printing the image on the print medium.

* * * * *